United States Patent
Hayakawa et al.

(10) Patent No.: US 12,460,390 B2
(45) Date of Patent: Nov. 4, 2025

(54) COMPLETED-WORK INFORMATION PROCESSING SYSTEM

(71) Applicant: HITACHI CONSTRUCTION MACHINERY CO., LTD., Tokyo (JP)

(72) Inventors: Naoki Hayakawa, Ushiku (JP); Shiho Izumi, Hitachinaka (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 18/022,803

(22) PCT Filed: Dec. 17, 2021

(86) PCT No.: PCT/JP2021/046885
§ 371 (c)(1),
(2) Date: Feb. 23, 2023

(87) PCT Pub. No.: WO2022/209052
PCT Pub. Date: Oct. 6, 2022

(65) Prior Publication Data
US 2023/0313504 A1    Oct. 5, 2023

(30) Foreign Application Priority Data
Mar. 31, 2021  (JP) .................. 2021-061494

(51) Int. Cl.
*E02F 9/26* (2006.01)
*G07C 5/02* (2006.01)

(52) U.S. Cl.
CPC .............. *E02F 9/261* (2013.01); *E02F 9/264* (2013.01); *G07C 5/02* (2013.01)

(58) Field of Classification Search
CPC ............. E02F 9/261; E02F 9/264; G07C 5/02
See application file for complete search history.

(56) References Cited

U.S. PATENT DOCUMENTS

| 6,047,227 A | 4/2000 | Henderson et al. |
| 10,480,157 B2 | 11/2019 | Friend et al. |

(Continued)

FOREIGN PATENT DOCUMENTS

| JP | 11-36373 A | 2/1992 |
| JP | 2005-134015 A | 5/2005 |

(Continued)

OTHER PUBLICATIONS

English Machine Translation of JP-2006200185-A (Year: 2006).*

(Continued)

*Primary Examiner* — Andrew J Cromer
(74) *Attorney, Agent, or Firm* — Mattingly & Malur, PC

(57) ABSTRACT

The invention of the present application intends to provide a completed-work information processing system that can generate terrain profile data that is easy to associate with the contents of work and a work area, on the basis of working history data that can be acquired in work execution by a work machine. For this purpose, a computation device computes movement loci of a work device when the work device is executing work of the ground and acquires working information from a working information acquiring device when determining that the work device is executing the work of the ground, records data in which the working information is associated with the movement loci of the work device, as the working history data, and outputs the terrain profile data to which the working information is added, with use of a movement locus assumed to be the current terrain profile among the movement loci of the work device included in the working history data and the working information associated with the movement locus assumed to be the current terrain profile.

1 Claim, 22 Drawing Sheets

(56) References Cited

U.S. PATENT DOCUMENTS

| | | |
|---|---|---|
| 2010/0201706 A1 | 8/2010 | Nielsen et al. |
| 2014/0100712 A1 | 4/2014 | Nomura et al. |
| 2016/0024757 A1 | 1/2016 | Nomura et al. |
| 2018/0218304 A1 | 8/2018 | Shike |
| 2018/0258608 A1* | 9/2018 | Uetake .................. B65G 15/00 |
| 2020/0071909 A1 | 3/2020 | Harada et al. |
| 2022/0010522 A1 | 1/2022 | Shiratani et al. |

FOREIGN PATENT DOCUMENTS

| | | | |
|---|---|---|---|
| JP | 2006200185 A | * | 8/2006 |
| JP | 2014-205955 A | | 10/2014 |
| JP | 2016-099744 A | | 5/2016 |
| JP | 2016-102312 A | | 6/2016 |
| JP | 2016-130409 A | | 7/2016 |
| JP | 2017-071916 A | | 4/2017 |
| JP | 6329060 B2 | * | 5/2018 |
| WO | 2014/054194 A1 | | 4/2014 |
| WO | 2018/179963 A1 | | 10/2018 |
| WO | 2020/203843 A1 | | 10/2020 |

OTHER PUBLICATIONS

English Machine Translation of JP-6329060-B2 (Year: 2014).*
International Preliminary Report on Patentability received in corresponding International Application No. PCT/JP2021/046885 dated Oct. 12, 2023.
Japanese Office Action received in corresponding Japanese Application No. 2023-510243 dated Feb. 13, 2024.
International Search Report of PCT/JP2021/046885 dated Mar. 8, 2021.
Extended European Search Report received in corresponding European Application No. 21935201.0 dated Feb. 17, 2025.

* cited by examiner

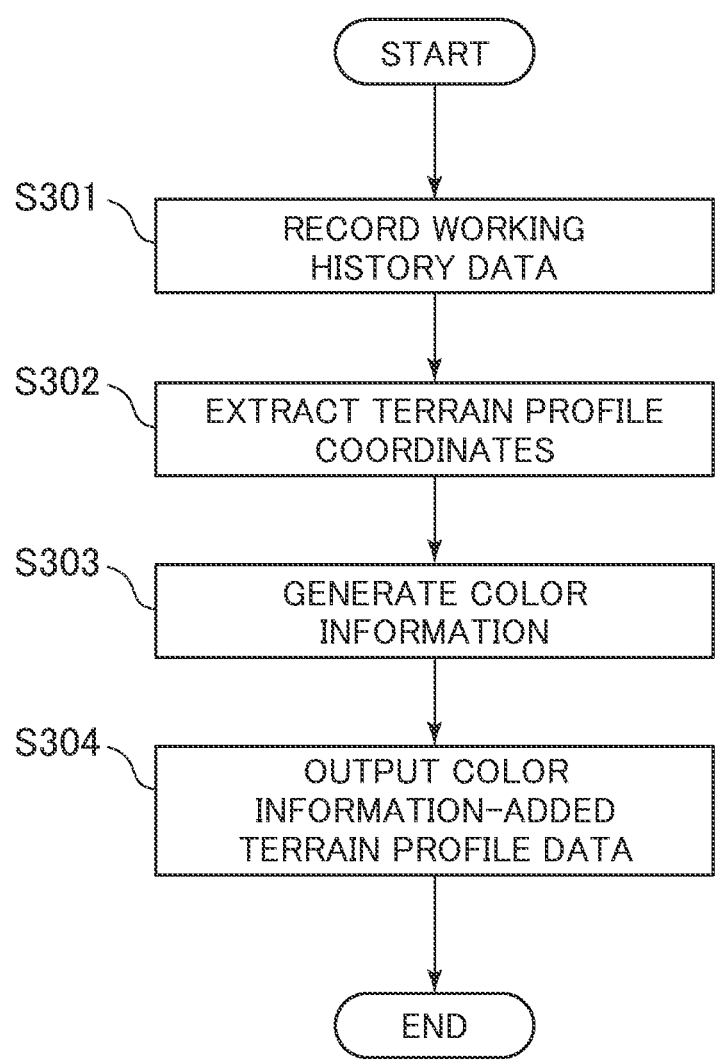

COMPLETED-WORK INFORMATION PROCESSING SYSTEM

TECHNICAL FIELD

The present invention relates to a system that generates completed-work information from working history data of a work machine.

BACKGROUND ART

Conventionally, there is known an information-oriented construction-compatible work machine that provides such functions as a machine guidance function of presenting the position and the posture of the machine body and constituent elements such as a boom, an arm, and a bucket and working target surface information of surroundings of the machine body with respect to target surface data created by three-dimensional CAD software or the like and a machine control function of executing control to cause the bucket of the machine body to move along a target working surface.

In recent years, there is a widespread trend of recording three-dimensional coordinate information of a work implement computed in order to provide these functions, as working history data, together with working date-and-time information, and using the data. As a representative example thereof, there is a case example in which terrain profile data is generated from locus information of a bucket recorded in the working history data and is utilized for partial payment for earned value or earned value management in dredging work.

As such a method in which the terrain profile data is generated based on the working history data, there has been proposed a method in which an arm crowding action is sensed based on a pilot pressure or an arm cylinder pressure and completed-work information is updated according to the three-dimensional position of a monitoring point in a completed-work information processing device described in Patent Document 1.

PRIOR ART DOCUMENT

Patent Document

Patent Document 1: JP-2006-200185-A

SUMMARY OF THE INVENTION

Problem to be Solved by the Invention

The method described in Patent Document 1 can obtain the terrain profile data of completed work without special measuring equipment and execution of measurement work. However, regarding the terrain profile data obtained here, there is no suggestion regarding information other than three-dimensional position information. As described also in an embodiment in Patent Document 1, to utilize this terrain profile data for progress management or the like, the terrain profile data needs to be associated with a work area, the contents of work, and so forth while the work area, the contents of work, and so forth are inferred by being combined with a work machine such as a hydraulic excavator, a map, and so forth. As described above, the terrain profile data obtained by the conventional method involves such a problem that, with the terrain profile data alone, it is difficult to associate the work area and the contents of work with the three-dimensional position information on the terrain profile data.

The present invention is made in view of the above-described problem, and an object thereof is to provide a completed-work information processing system that can generate terrain profile data whose relation to the contents of work and a work area is easy to understand, on the basis of working history data that can be acquired in work execution by a work machine.

Means for Solving the Problem

In order to achieve the above-described object, in the present invention, in a completed-work information processing system including a computation device that generates terrain profile data that represents a current terrain profile obtained after work execution by a work device of a work machine, the completed-work information processing system includes an operation amount sensor that senses the operation amount of the work machine, position-posture sensors that sense the position of the work machine and the posture of the work device, a driving state sensor that senses a driving state of the work device, and a working information acquiring device that acquires working information that is information relating to work execution when the work device is executing work of the ground. The computation device is configured to determine whether or not the work device is executing work of the ground, on the basis of sensed values from the operation amount sensor, the position-posture sensors, and the driving state sensor, compute movement loci of the work device when the work device is executing the work of the ground and acquire the working information from the working information acquiring device when determining that the work device is executing the work of the ground, record data in which the working information is associated with the movement loci of the work device, as working history data, and output the terrain profile data to which the working information is added with use of a movement locus assumed to be the current terrain profile among the movement loci of the work device included in the working history data and the working information associated with the movement locus assumed to be the current terrain profile.

According to the present invention configured as above, it becomes possible to recognize the working information of each part of the current terrain profile, making it easier to associate the current terrain profile with the work area and the contents of work.

Advantages of the Invention

According to the completed-work information processing system according to the present invention, it becomes possible to generate the terrain profile data that is easy to associate with the contents of work and the work area, on the basis of the working history data that can be acquired in work execution by the work machine.

BRIEF DESCRIPTION OF THE DRAWINGS

FIG. 22 is a flowchart illustrating computation processing of the terrain profile data computing section in the second embodiment of the present invention.

MODES FOR CARRYING OUT THE INVENTION

Embodiments of the present invention will be described below with use of the drawings. In the following, a hydraulic excavator including a bucket as an attachment at the distal end of a work machine will be exemplified. However, the present invention may be applied to a hydraulic excavator including an attachment other than the bucket and a work machine such as a bulldozer.

First Embodiment

Figure 1:
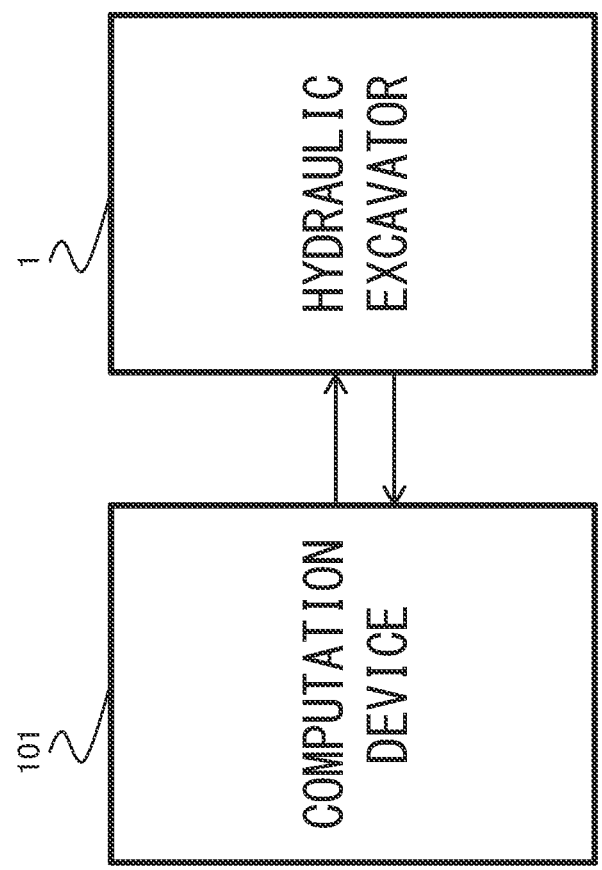
FIG. 1 is a configuration diagram of a completed-work information processing system according to a first embodiment of the present invention.

FIG. 1 is a configuration diagram of a completed-work information processing system according to a first embodiment of the present invention. In FIG. 1, the completed-work information processing system according to the present embodiment is configured by a computation device 101 capable of transmitting and receiving data with a hydraulic excavator 1. The computation device 101 is configured by single or multiple computers including a computation processing device such as a CPU, a RAM, and a ROM, various sensors, and an input-output interface that exchanges information with actuators and so forth, for example. Part or the whole of the computation device 101 may be configured by an in-vehicle controller mounted on the hydraulic excavator 1 or may be configured by a server or the like connected to various devices on the hydraulic excavator 1 by a network.

Figure 2:
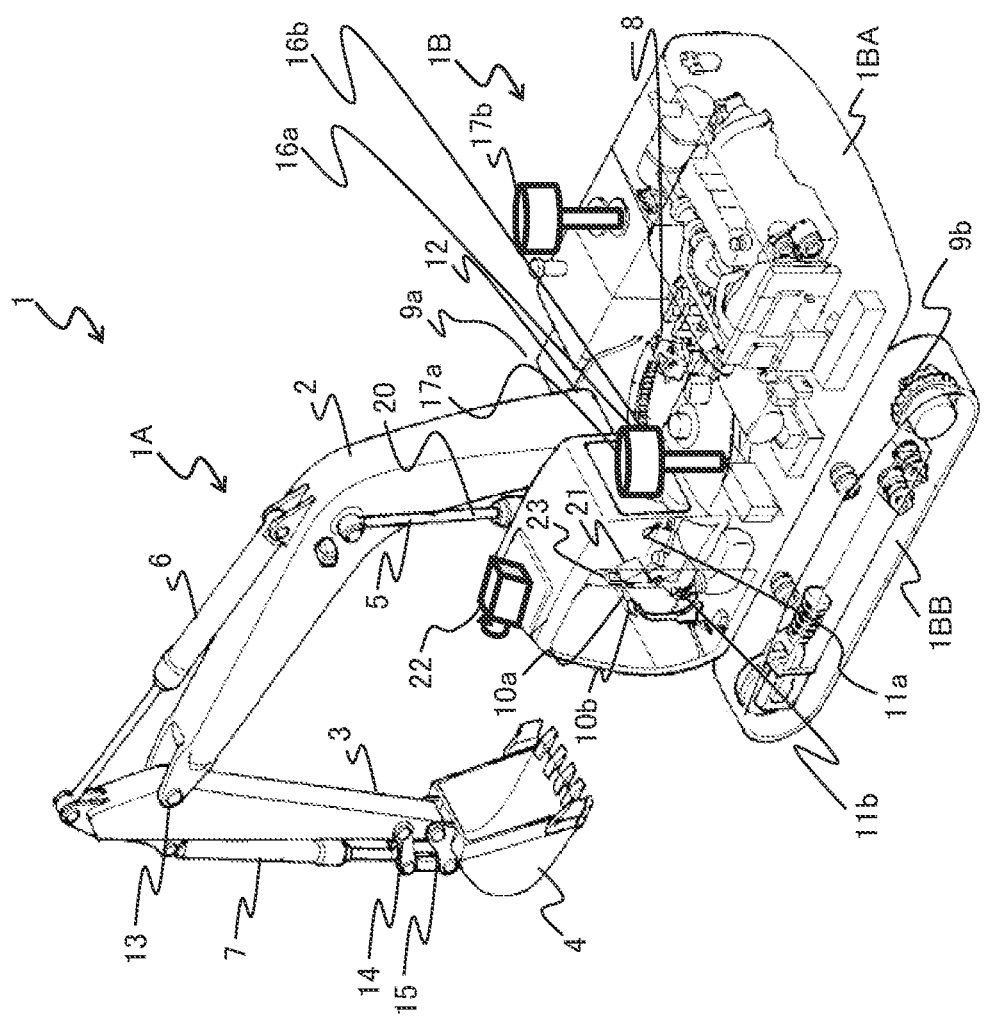
FIG. 2 is a configuration diagram of a hydraulic excavator in the first embodiment of the present invention.

FIG. 2 is a configuration diagram of the hydraulic excavator 1. As illustrated in FIG. 2, the hydraulic excavator 1 is configured by an articulated front work device 1A configured by joining multiple driven components (boom 2, arm 3, and bucket 4) that each pivot in the vertical direction and a machine body 1B composed of an upper swing structure 1BA and a lower track structure 1BB, and the base end of the boom 2 of the front work device 1A is supported by a front part of the upper swing structure 1BA.

The boom 2, the arm 3, the bucket 4, the upper swing structure 1BA, and the lower track structure 1BB configure driven components driven by a boom cylinder 5, an arm cylinder 6, a bucket cylinder 7, a swing hydraulic motor 8, and left and right travelling motors 9a and 9b, respectively, and an instruction regarding the action of them is given by operation of a travelling right lever 10a, a travelling left lever 10b, an operation right lever 11a, and an operation left lever 11b in a cab on the upper swing structure 1BA. The respective operation amounts of the travelling right lever 10a, the travelling left lever 10b, the operation right lever 11a, and the operation left lever 11b are sensed by an operation amount sensor 20. The operation amount mentioned here is a physical quantity (pilot pressure, voltage, lever inclination angle, or the like) that changes in response to operation of each lever. The operation amount sensor 20 is configured by a pressure sensor, a voltage sensor, an angle sensor, or the like. A driving state sensor 19 (see FIG. 4) that senses the driving state of the boom cylinder 5 is attached to the boom cylinder 5. The driving state sensor 19 is configured by a pressure sensor that measures hydraulic operating fluid pressures Pr and Pb of the rod side and the bottom side of the boom cylinder 5, for example.

A first GNSS antenna 17a and a second GNSS antenna 17b are disposed on the upper swing structure 1BA. The first GNSS antenna 17a and the second GNSS antenna 17b are antennas for RTK-GNSS (Real Time Kinematic-Global Navigation Satellite Systems), and a GNSS receiver 17 (see FIG. 4) outputs antenna position information regarding each antenna. In the present embodiment, description will be given with use of the GNSS receiver 17 that outputs coordinate values of a site coordinate system. However, it suffices for the GNSS receiver 17 to be one that can output coordinate values of at least one coordinate system of a geographic coordinate system, a plane rectangular coordinate system, a geocentric Cartesian coordinate system, or a site coordinate system. The coordinate values in the geographic coordinate system are composed of the latitude, the longitude, and the ellipsoidal height, and the plane rectangular coordinate system, the geocentric Cartesian coordinate system, and the site coordinate system are three-dimensional orthogonal coordinate systems in which the coordinate values are composed of E-, N-, and H-coordinates or the like. The coordinate values of the geographic coordinate system can be transformed to a three-dimensional orthogonal coordinate system such as the plane rectangular coordinate system by use of the Gauss-Kruger projection method or the like. Moreover, the plane rectangular coordinate system, the geocentric Cartesian coordinate system, and the site coordinate system can mutually be transformed by use of affine transformation, Helmert transformation, or the like.

A boom angle sensor 12, an arm angle sensor 13, and a bucket angle sensor 14 are attached to a boom pin, an arm pin, and a bucket link 15, respectively, in such a manner as to allow measurement of pivot angles α, β, and γ (see FIG. 3) of the boom 2, the arm 3, and the bucket 4. To the upper swing structure 1BA, a machine body front-rear inclination angle sensor 16a that senses a pitch angle θp (see FIG. 2) of the upper swing structure 1BA (machine body 1B) with respect to a reference surface (for example, a horizontal surface) and a machine body left-right inclination angle sensor 16b that senses a roll angle θr (not illustrated) are attached. As these angle sensors, such sensors as an IMU (Inertial Measurement Unit: inertial measurement device), a potentiometer, and a rotary encoder may be used. Alternatively, the lengths of the respective cylinders may be measured by stroke sensors, and the pivot angles may be computed. Moreover, the bucket angle sensor 14 may be attached to the bucket 4 instead of the bucket link 15. The boom angle sensor 12, the arm angle sensor 13, the bucket angle sensor 14, the machine body front-rear inclination angle sensor 16a, the machine body left-right inclination angle sensor 16b, and the GNSS receiver 17 configure position-posture sensors that sense the position and the posture of the hydraulic excavator 1.

A target surface data input device 21 is attached to the upper swing structure 1BA, and target surface data is inputted to the computation device 101 through wireless communication of WiFi, Bluetooth, or the like or a recording medium such as a USB flash memory or an SD card. Moreover, a display device 23 that displays various kinds of information is attached to the upper swing structure 1BA.

Figure 3:
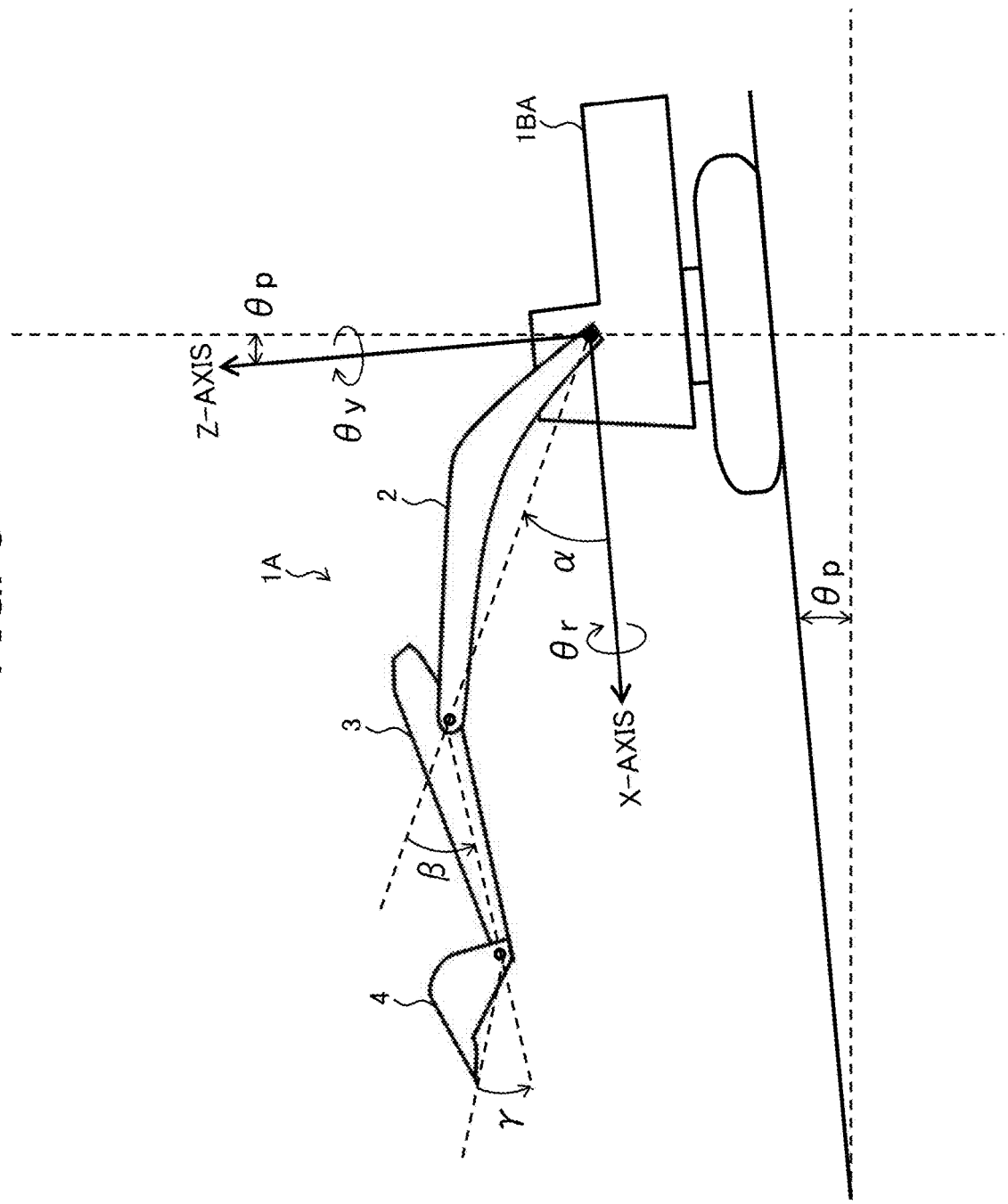
FIG. 3 is a diagram representing a machine body coordinate system of the hydraulic excavator in the first embodiment of the present invention.

FIG. 3 is a diagram representing a machine body coordinate system of the hydraulic excavator 1. An X-axis and a Z-axis described in FIG. 3 represent the machine body coordinate system in which the boom pin is deemed as the origin, the machine body upward direction is deemed as the Z-axis, the forward direction is deemed as the X-axis, and the left direction is deemed as a Y-axis. Here, when the coordinate values of the first GNSS antenna 17a in the machine body coordinate system are known through design dimensions or measurement by a measuring instrument such as a total station, the machine body coordinate system and the site coordinate system can mutually be transformed by use of the pitch angle θp of the machine body, the roll angle θr, an azimuth angle θy (not illustrated) sensed from the positional relation between the first GNSS antenna 17a and the second GNSS antenna 17b, the coordinate values of the first GNSS antenna 17a in the machine body coordinate system, and the coordinate values of the first GNSS antenna 17a in the site coordinate system based on RTK-GNSS positioning. Position information of the machine body coordinate system regarding a desired monitoring point on the front work device 1A can be computed from the pivot angles α, β, and γ of the boom 2, the arm 3, and the bucket 4 and dimension values of the front work device 1A. Thus, position information of the site coordinate system regarding the desired monitoring point on the front work device 1A can be obtained.

An imaging device 22 illustrated in FIG. 2 is a device that photographs surroundings of the bucket 4 and is a camera including an imaging element of a CCD (Charge Coupled Device), a CMOS (Complementary Metal Oxide Semiconductor), or the like. While the imaging device 22 is installed on the upper swing structure 1BA in the present embodiment, it suffices for the imaging device 22 to be attached to a position from which surroundings of the bucket 4 can be photographed. Moreover, the imaging device 22 may be installed at multiple places. The attachment position and the photographing direction in the machine body coordinate system and internal parameters regarding the imaging device 22 are known or can be sensed, and coordinate transformation parameters of coordinate values in the camera coordinate system and coordinate values in the machine body coordinate system regarding the imaging device 22 are known or can be sensed. Hence, they can mutually be transformed. Further, because the machine body coordinate system and the site coordinate system can mutually be transformed, the camera coordinate system and the site coordinate system can also mutually be transformed. The imaging device 22 in the present embodiment configures a working information acquiring device that acquires working information that is information relating to work execution when the work device 1A is executing work of the ground, and acquires color information of a working surface as the working information.

Figure 4:
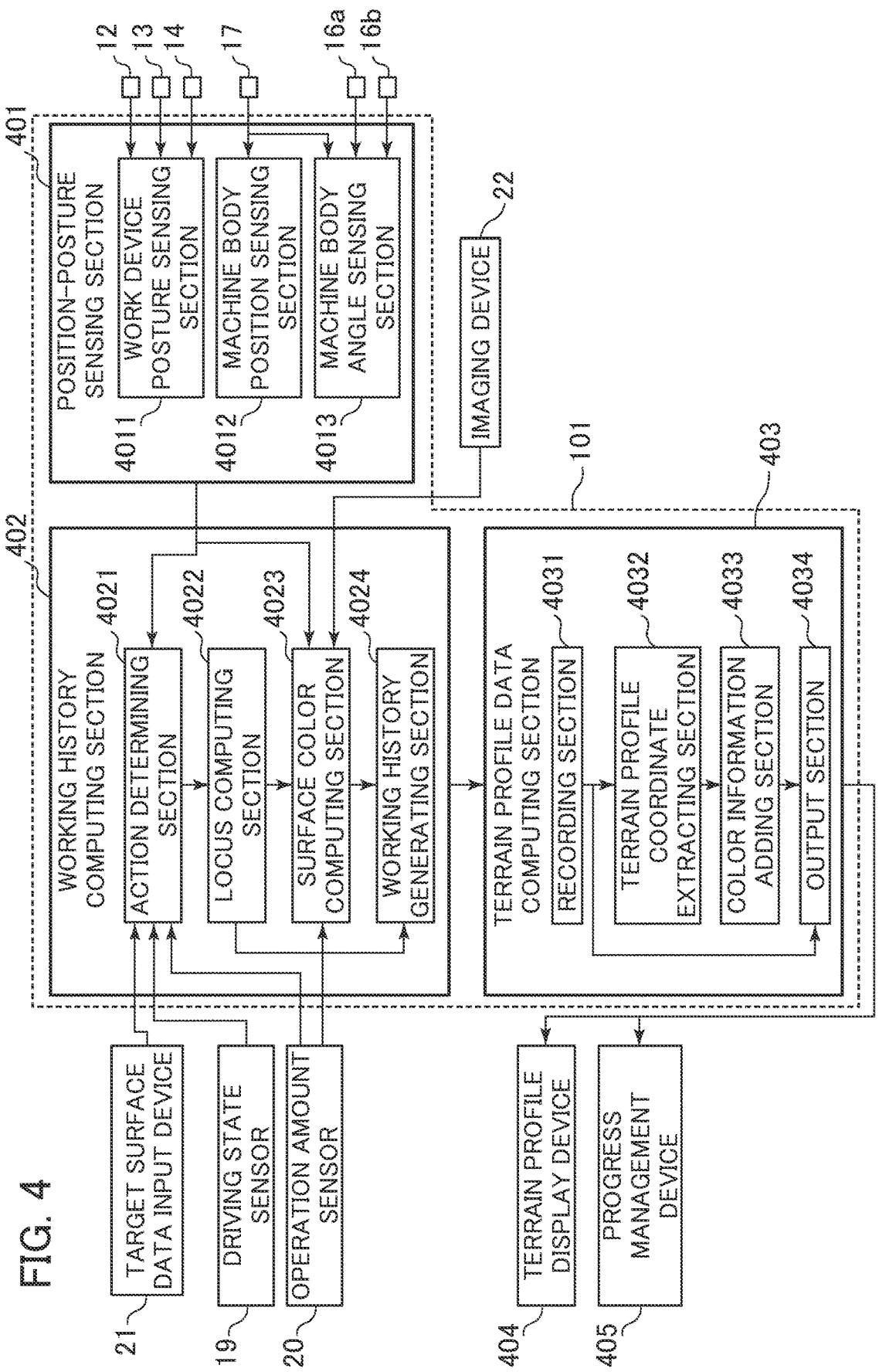
FIG. 4 is a functional block diagram of a computation device in the first embodiment of the present invention.

FIG. 4 is a functional block diagram of the computation device 101 in the present embodiment. The computation device 101 includes a position-posture sensing section 401, a working history computing section 402, and a terrain profile data computing section 403.

The position-posture sensing section 401 includes a work device posture sensing section 4011, a machine body position sensing section 4012, and a machine body angle sensing section 4013.

The work device posture sensing section 4011 receives, as inputs, sensor values of the boom angle sensor 12, the arm angle sensor 13, and the bucket angle sensor 14, and outputs the pivot angles α, β, and γ (see FIG. 3) of the boom 2, the arm 3, and the bucket 4.

The machine body position sensing section 4012 receives the antenna position information outputted by the first GNSS antenna 17a, as an input, performs a coordinate transformation to the site coordinate system when the position information is input with a coordinate system other than the site coordinate system, and outputs the antenna position information of the site coordinate system.

The machine body angle sensing section 4013 receives, as inputs, the antenna position information outputted by the GNSS receiver 17 and sensor values of the machine body front-rear inclination angle sensor 16a and the machine body left-right inclination angle sensor 16b, and outputs the azimuth angle θy, the roll angle θr, and the pitch angle θp (see FIG. 3).

The working history computing section 402 includes an action determining section 4021, a locus computing section 4022, a surface color computing section 4023, and a working history generating section 4024.

The action determining section 4021 receives, as inputs, position-posture information outputted by the position-posture sensing section 401, pressure information of the boom cylinder 5 outputted by the driving state sensor 19, operation amount information of the front work device 1A outputted by the operation amount sensor 20, and working target surface information outputted by the target surface data input device, and outputs an action determination result and the X- and Z-coordinates of a bucket monitoring point in the machine body coordinate system.

The action determining section 4021 first checks whether or not the front work device 1A is being operated from the operation amount information outputted by the operation amount sensor 20. When operation of any one or more of the respective parts of the front work device 1A is being executed, the action determining section 4021 determines whether or not the bucket 4 is in a grounded state from the balance of moments around the boom pin. When it is determined that the bucket 4 is in a grounded state here, the action determining section 4021 executes action determination by using the operation amount information and the working target surface information.

The method for determining whether or not the bucket 4 is in a grounded state will be described with use of FIG. 5 to FIG. 7.

Figure 5:
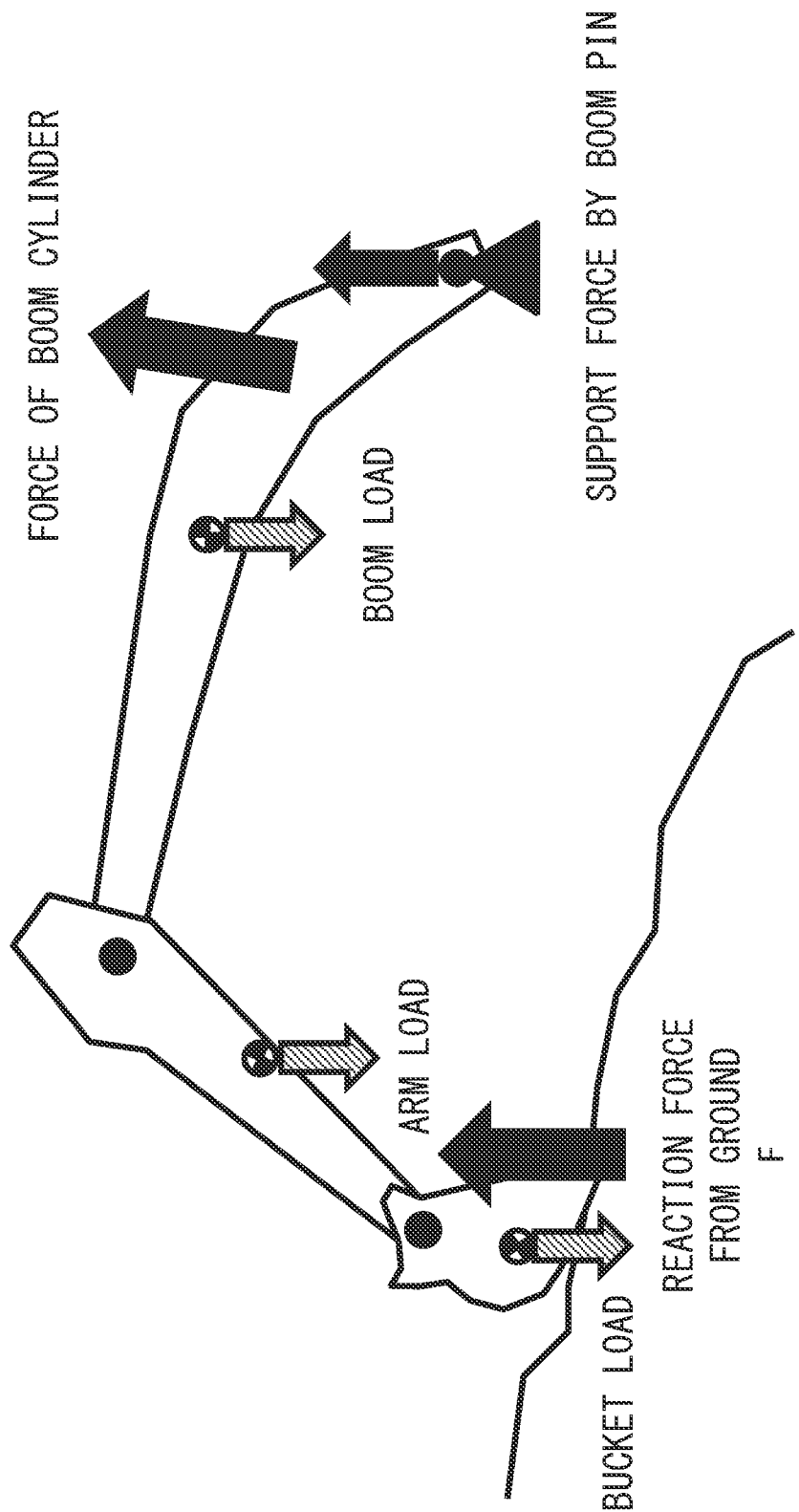
FIG. 5 is a diagram illustrating forces that act on a front work device.

FIG. 5 is a diagram illustrating forces that act on the front work device 1A. On the front work device 1A, besides a support force by the boom pin, loads according to the mass of the boom 2, the arm 3, and the bucket 4, a reaction force from the ground, and a force by the boom cylinder 5 act. When a moment caused by the reaction force F from the ground is defined as $M_F$, a moment caused by a force $F_{cyl}$ of the boom cylinder 5 is defined as $M_{cyl}$, and moments caused by the loads of the boom 2, the arm 3, and the bucket 4 are defined as $M_{bm}$, $M_{am}$, and $M_{bk}$, respectively, these moments balance out as in formula 1. Here, the moment caused by the reaction force F from the ground can be represented as in formula 2, and hence, the reaction force F from the ground can be obtained by formula 3 from formula 1 and formula 2.

[Math. 1]

$$M\_F + M\_cyl = M\_bm + M\_am + M\_bk \quad \text{Formula 1}$$

[Math. 2]

$$M_F = F \times X_{bkmp} \quad \text{Formula 2}$$

[Math. 3]

$$F = \frac{M_{bm} + M_{am} + M_{bk} - M_{cyl}}{X_{bkmp}} \quad \text{Formula 3}$$

Here, the X-coordinate of the machine body coordinate system regarding a place that can be estimated as the place on which the reaction force from the ground acts is defined as $X_{bkmp}$. The place that can be estimated as the place on which the reaction force from the ground acts may be decided according to the position-posture information and the working target surface information as the "point closest to the target surface in the bucket" or the like, or may be fixed at a specific part such as a bucket claw tip. In the present embodiment, the coordinate values of the machine body coordinate system regarding the outer circumference of the bucket 4 and the target surface are obtained by use of the position-posture information, and the X-coordinate of the point closest to the target surface in the outer circumference of the bucket 4 (bucket monitoring point) is defined as $X_{bkmp}$. $X_{bkmp}$ can be expressed by formula 4 with use of a boom length $L_{bm}$, an arm length $L_{am}$, a distance $L_{bkmp}$ from a bucket pin to the bucket monitoring point, and an angle $\gamma_{mp}$ formed by a straight line that links the bucket monitoring point and the bucket pin and a straight line that links the bucket pin and the bucket claw tip.

[Math. 4]

$$X_{bkmp} = L_{bm} \cos \alpha + L_{am} \cos(\alpha+\beta) + L_{bkmp} \cos(\alpha+\beta+\gamma+\gamma_{mp}) \quad \text{Formula 4}$$

Figure 6:
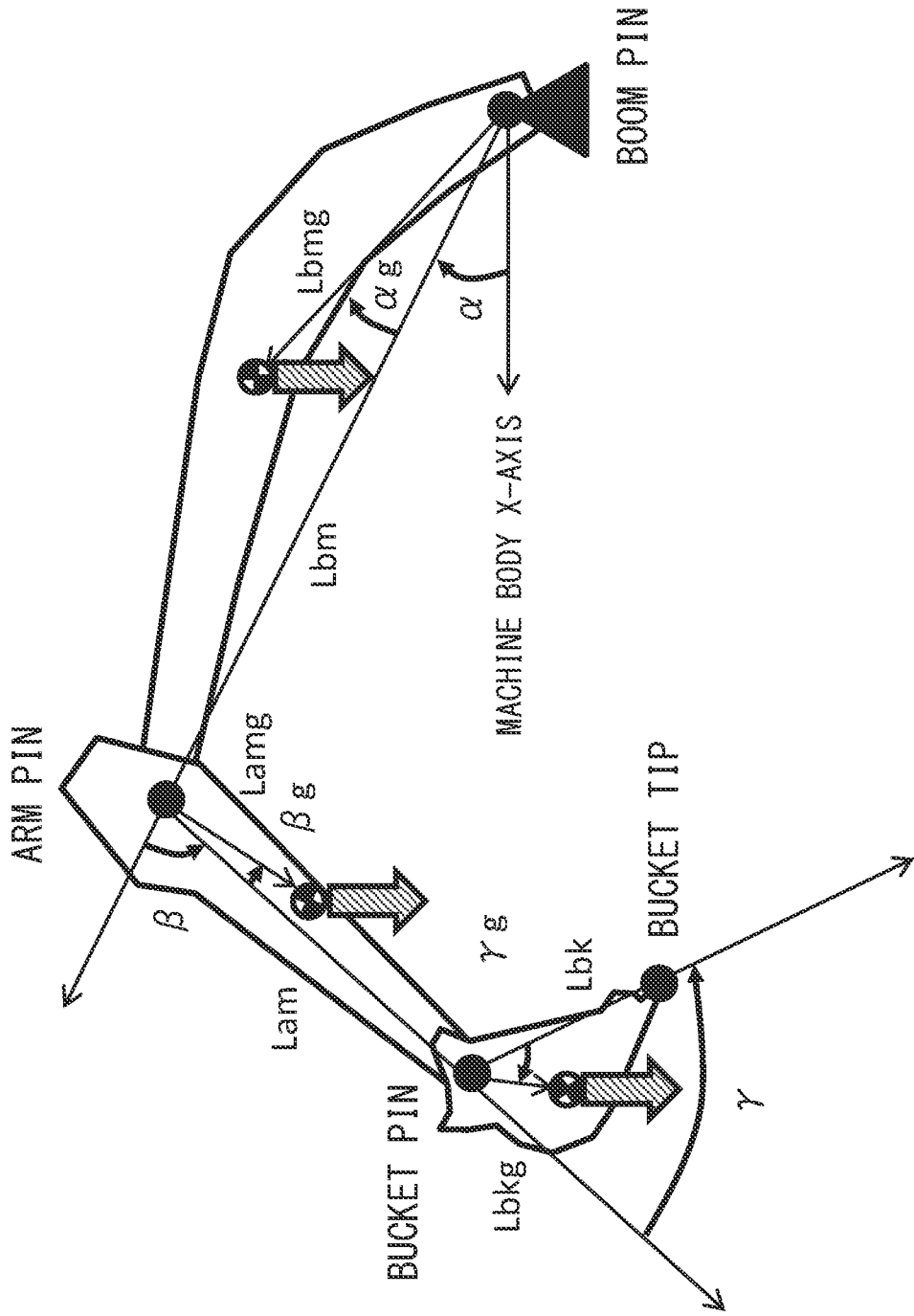
FIG. 6 is a diagram illustrating the lengths and the angles of the respective parts of the front work device.

The lengths and the angles of the respective parts of the front work device 1A are illustrated in FIG. 6. $M_{bm}$, $M_{am}$, and $M_{bk}$, which are the moments caused by the load, among the respective moments in formula 3, can be obtained by formula 5 to formula 7.

[Math. 5]

$$M_{bm} = m_{bm} \cdot (g_z + \ddot{\alpha} \cdot X_{bmg}) \times X_{bmg} \quad \text{Formula 5}$$

[Math. 6]

$$M_{am} = m_{am} \cdot (g_z + \ddot{\beta} \cdot X_{amg}) \times X_{amg} \quad \text{Formula 6}$$

[Math. 7]

$$M_{bk} = m_{bk} \cdot (g_z + \ddot{\gamma} \cdot X_{bkg}) \times X_{bkg} \quad \text{Formula 7}$$

In formula 5 to formula 7, $m_{bm}$, $m_{am}$, and $m_{bk}$ are the mass of the boom 2, the arm 3, and the bucket 4, $g_z$ is a Z-axis direction component of the gravity acceleration in the machine body coordinate system, and $\ddot{\alpha}$, $\ddot{\beta}$, and $\ddot{\gamma}$ are the angular accelerations of the boom 2, the arm 3, and the bucket 4. When these angular accelerations are sufficiently low, these angular accelerations do not need to be used. Moreover, X-coordinates $X_{bmg}$, $X_{amg}$, and $X_{bkg}$ of the machine body coordinate system regarding the center of gravity of the boom 2, the arm 3, and the bucket 4 can be derived by formula 8 to formula 10, respectively.

[Math. 8]

$$X_{bmg} = L_{bmg} \cos(\alpha + \alpha_g) \quad \text{Formula 8}$$

[Math. 9]

$$X_{amg} = L_{bm} \cos \alpha + L_{amg} \cos(\alpha + \beta + \beta_g) \quad \text{Formula 9}$$

[Math. 10]

$$X_{bkg} = L_{bm} \cos \alpha + L_{am} \cos(\alpha+\beta) + L_{bkg} \cos(\alpha+\beta+\gamma+\gamma_g) \quad \text{Formula 10}$$

In formula 8 to formula 10, $L_{bmg}$, $L_{amg}$, and $L_{bkg}$ are the distances from the pin to the position of the center of gravity in each part. $\alpha_g$, $\beta_g$, and $\gamma_g$ are angles formed by a straight line that links the position of the center of gravity of each part and the pin at the root of each part and a straight line that links the tip and the root of each part (see FIG. 6).

Figure 7:
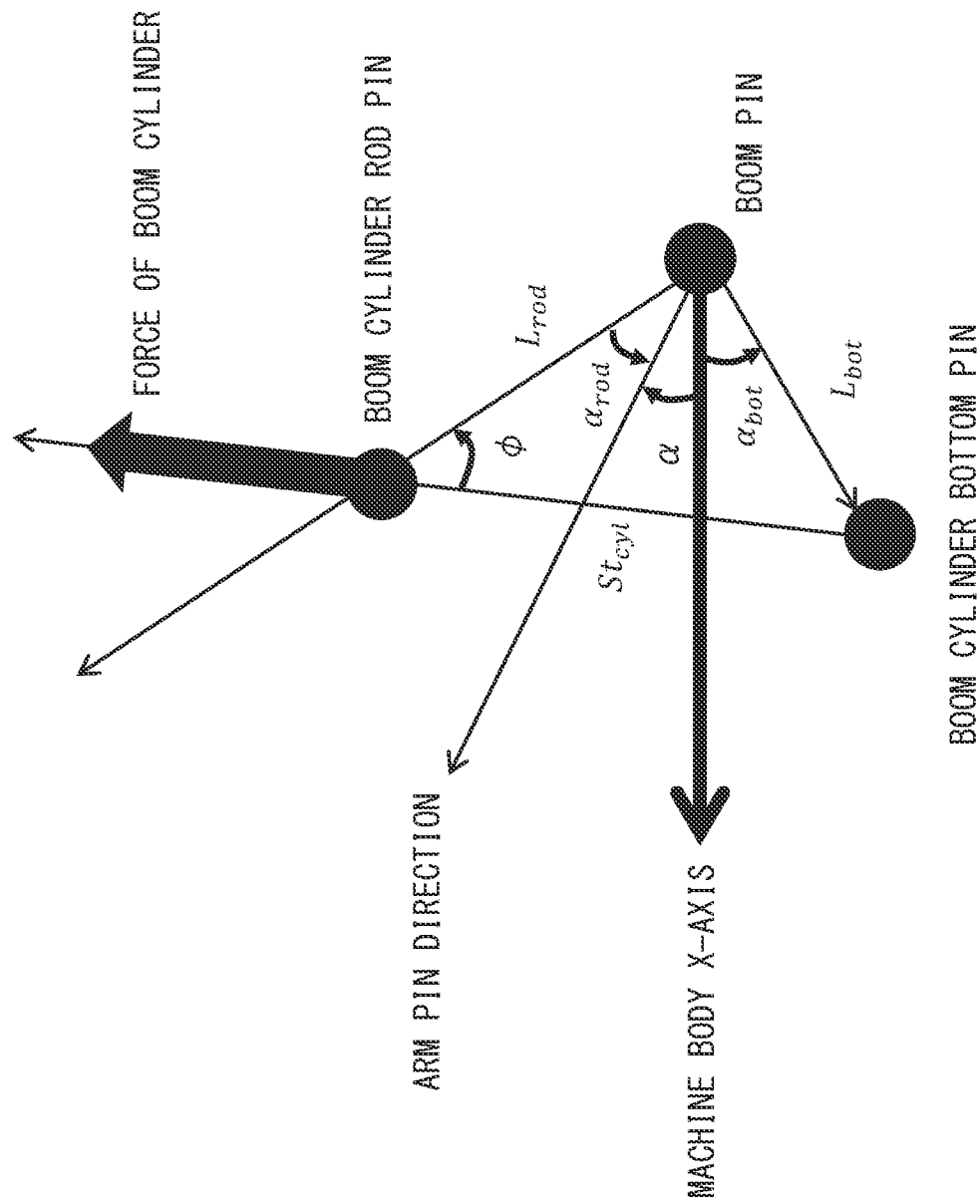
FIG. 7 is a diagram illustrating the lengths and the angles of the respective parts of a boom cylinder peripheral part.

In FIG. 7, the lengths and the angles of the respective parts of a boom cylinder peripheral part are illustrated. The moment $M_{cyl}$ by the boom cylinder 5 among the respective moments in formula 3 can be derived by formula 11.

[Math. 11]

$$M_{cyl} = F_{cyl} \times L_{rod} \times \sin \varphi \quad \text{Formula 11}$$

Here, the force $F_{cyl}$ can be represented as in formula 12 with use of the hydraulic operating fluid pressures $P_r$ and $P_b$ of the rod side and the bottom side of the boom cylinder 5 and the respective pressure receiving areas $S_r$ and $S_b$ thereof.

[Math. 12]

$$F_{cyl} = P_b \times S_b - P_r \times S_r \quad \text{Formula 12}$$

Moreover, $L_{rod}$ in formula 11 is the distance between the boom pin and a boom cylinder rod pin, and p is the angle formed by a straight line that links the boom pin and the boom cylinder rod pin and a straight line that links the boom cylinder rod pin and a boom cylinder bottom pin. The angle φ can be derived by using formula 14 through obtaining a length $St_{cyl}$ of the boom cylinder 5 by formula 13 with use of the law of cosines.

[Math. 13]

$$St_{cyl} = \sqrt{L_{rod}^2 + L_{bot}^2 - 2 \cdot L_{rod} \cdot L_{rod} \cdot \cos(\alpha + \alpha_{rod} + \alpha_{bot})} \quad \text{Formula 13}$$

[Math. 14]

$$\varphi = \cos^{-1}\left(\frac{L_{bot}^2 - L_{rod}^2 - St_{cyl}^2}{2 \cdot L_{rod} \cdot St_{cyl}}\right) \quad \text{Formula 14}$$

Although the reaction force of the ground is derived from the balance of moments in the present embodiment, the reaction force of the ground may be obtained by use of the balance of forces. In this case, the support force at the boom pin may be sensed by use of a load sensor or a distortion sensor and be used for computation.

When the reaction force of the ground obtained in the above-described manner is equal to or larger than a threshold, it is determined that the bucket 4 is in a grounded state. As the threshold used here, a proper value is set in consideration of the hardness of the ground, the contents of work, and so forth. For example, when excavation work of a soft ground is executed, the threshold is set to a small value due to the reaction force from the ground in the excavation work being small. When a hard ground is excavated, the threshold is set to a large value. Further, the threshold set here does not need to be a fixed value. For example, the maximum value of the force to press the bucket 4 against the ground varies according to the position of the bucket, and hence, the threshold may be set by a function of the X-coordinate of the machine body coordinate system, or the like. At this time, when a function f(Xkmp) of the threshold is set to one that is obtained by multiplying a certain constant Const by the reciprocal of Xbkmp as in formula 15, the grounded state can be determined by comparing the moment $M_F$ caused by the reaction force from the ground and the constant Const as illustrated in formula 16. Accordingly, depending on the setting condition of the threshold, the grounded state may be determined through comparison between the moment caused by the reaction force from the ground and the threshold without the reaction force from the ground being obtained.

[Math. 15]

$$F > f(X_{bkmp}) = \frac{Const}{X_{bkmp}} \quad \text{Formula 15}$$

[Math. 16]

$$M_F = F \times X_{bkmp} > Const \quad \text{Formula 16}$$

The threshold set here may be set through combining both the reaction force from the ground and the moment caused by the reaction force from the ground.

When it is determined that the bucket 4 is in a grounded state by the above-described processing, the action determination is executed. In the action determination, for example, the action is determined to be an excavation action when "the arm crowding operation amount is equal to or larger than a threshold" and "the bucket monitoring point whose distance from the target surface is the shortest is present at the bucket claw tip." The action is determined to be a bumping action when "the boom lowering operation amount is equal to or larger than a threshold" and "the arm and bucket operation amounts are smaller than a threshold." The action is determined to be a compaction action in other cases. In the threshold setting mentioned here, it is possible that proper setting of the set values differs depending on the habit in operation by the operator. Hence, it is desirable to actually execute such actions as excavation, bumping, and compaction, for example, a certain number of times and set thresholds on the basis of the operation amount and so forth on that occasion. Moreover, the action determination may be executed under conditions other than these conditions, or actions other than them may be defined and determined.

The locus computing section 4022 receives, as inputs, the action determination result and the X- and Z-coordinate values of the bucket monitoring point in the machine body coordinate system outputted by the action determining section 4021, and outputs bucket locus information. The output bucket locus information is retained in a RAM of the computation device 101.

First, the locus computing section 4022 decides the locus that should be computed as a bucket locus, on the basis of the action determination result outputted by the action determining section 4021. Here, a line segment that passes through the bucket monitoring point and is parallel to the Y-axis of the machine body coordinate system is defined as a bucket monitoring line segment. Both ends of the bucket monitoring line segment are on the left and right end surfaces of the bucket. As the locus that should be computed as the bucket locus, in the case of the excavation action or the compaction action, a plane surrounded by the bucket monitoring line segment at a certain moment t0 and the bucket monitoring line segment at t1 (timing when the position-posture sensing section 401 has sensed the posture last) immediately before the certain moment t0 is deemed as the bucket locus. In the case of the bumping action, the bucket bottom surface is deemed as the bucket locus.

Figure 8:
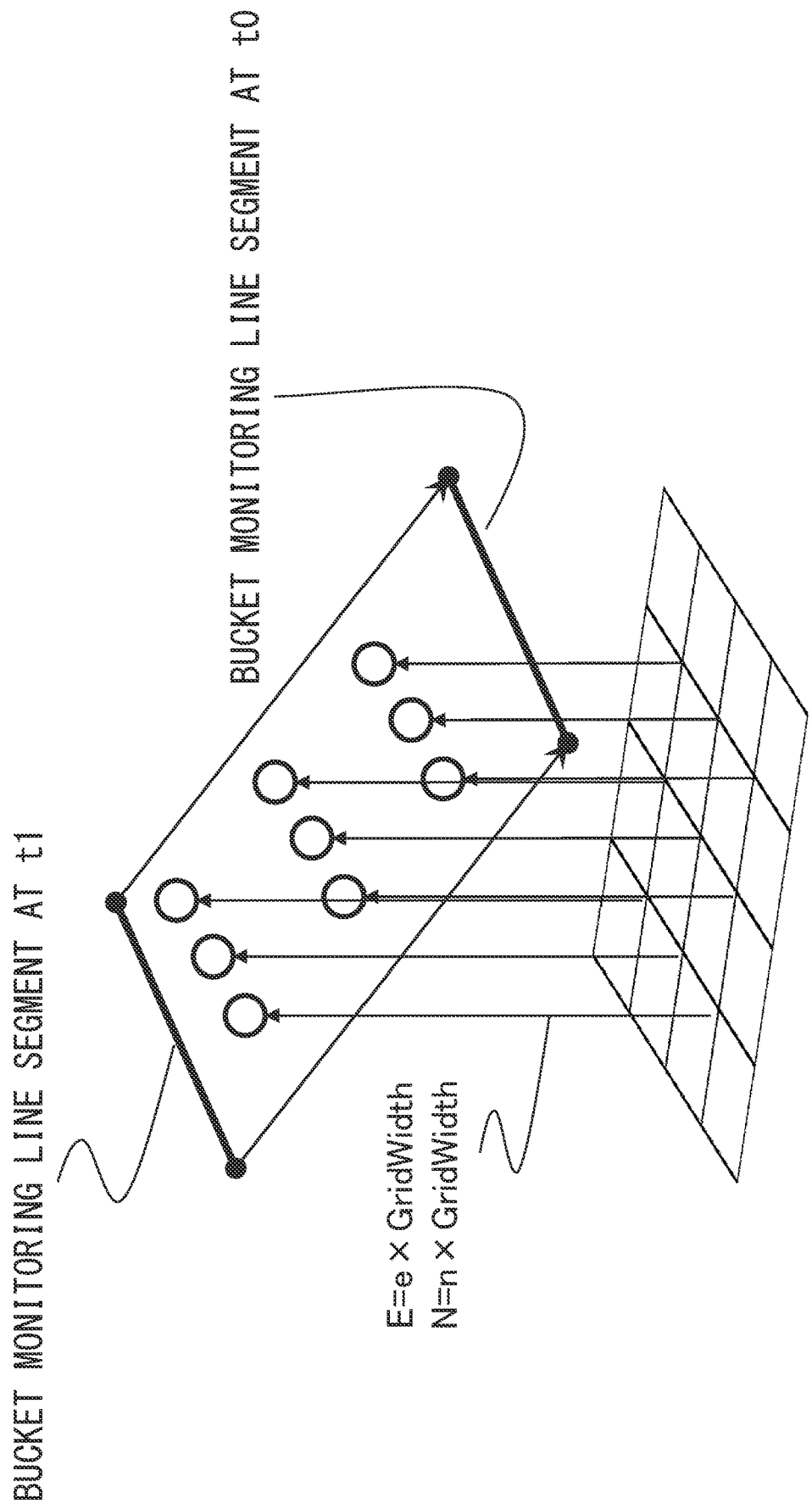
FIG. 8 is a diagram illustrating an image of bucket locus information.

Next, the bucket locus information is computed from the decided bucket locus. Here, the bucket locus information may be expressed by coordinate information of multiple points present on the bucket locus as illustrated in FIG. 8. In the present embodiment, the coordinates of the intersections of vertical straight lines passing through points whose E- and N-coordinates in the site coordinate system are integral multiples of a grid width (GridWidth) and the bucket locus are obtained as the bucket locus information.

[Math. 17]

$$E = e \times GridWidth \text{ and } N = n \times GridWidth, \quad \text{Formula 17}$$

where e and n are integers

Here, the grid width (GridWidth) is a value set with a sufficient resolution for the use purpose of terrain profile data. For example, when terrain profile data composed of a point group at a density of one or more points per 1 square meter is necessary, the grid width that should be set here is a value equal to or smaller than 1 m. The bucket locus information may be other than the information illustrated in the present embodiment and may be information with which the plane that configures the bucket locus can be identified. That is, the bucket locus information may be coordinate values of end points of the plane that configures the bucket locus or an equation of the plane that configures the bucket locus.

The surface color computing section 4023 receives, as inputs, the operation amount information outputted by the operation amount sensor 20, the bucket locus information that is outputted by the locus computing section 4022 and is retained on the RAM, the position-posture information outputted by the position-posture sensing section 401, and image information outputted by the imaging device 22, and outputs surface color information of the points corresponding to the bucket locus information.

The surface color computing section 4023 acquires the image information regarding the image photographed by the imaging device 22 when operation of the hydraulic excavator 1 is executed, on the basis of the operation amount information outputted by the operation amount sensor 20. In the acquired image information, the surface color computing section 4023 masks a part at which an obstacle such as the front work device 1A appears, by using the position-posture information outputted by the position-posture sensing section 401. At this time, when the point included in the bucket locus information retained on the RAM appears at a part that is not masked in the image information, the surface color computing section 4023 associates color information of the pixel that represents the point included in the bucket locus information with the coordinates of the point included in the bucket locus information and outputs them to the working history generating section 4024. The bucket locus information relating to the point for which output to the working history generating section 4024 has already been executed is deleted from the RAM.

Figure 9:
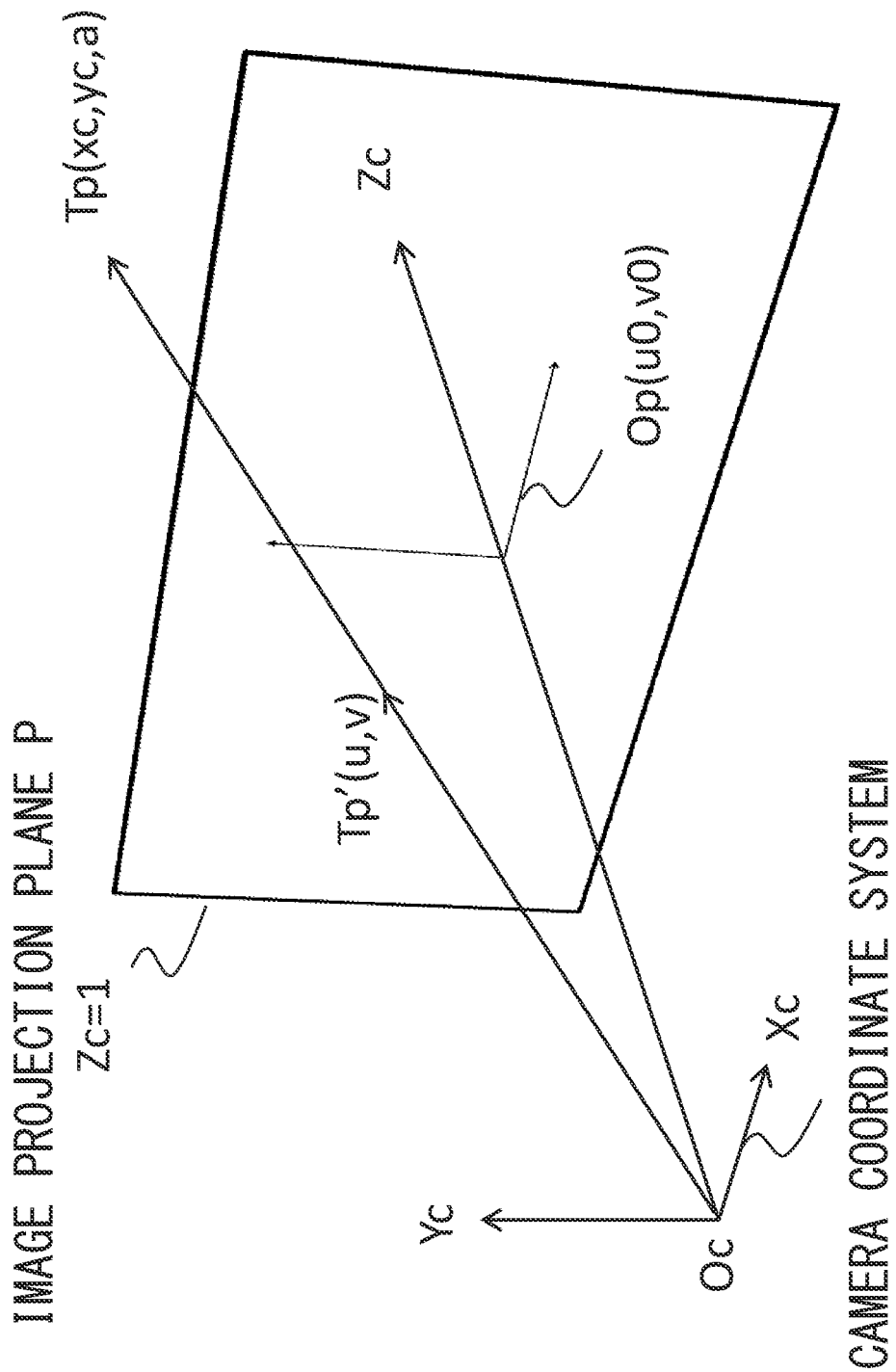
FIG. 9 is a diagram illustrating the definition of a camera coordinate system.

Processing of an image in the surface color computing section 4023 will be described below with use of FIG. 9. Defined is a camera coordinate system in which the optical center of the imaging device 22 is deemed as an origin Oc, the front side of the imaging device 22 is defined as Zc, the right side is defined as Xc, and the upper side is defined as Yc. When the coordinates of a center point Op of an image photographed by the imaging device 22 are defined as (u0, v0), a point Tp on an object recorded at a pixel of (u, v) in the image photographed by the imaging device 22 can be represented as in formula 18 in the camera coordinate system.

[Math. 18]

$$\overrightarrow{OcTp} = \alpha \cdot \overrightarrow{OcTp'}, \text{ where } \overrightarrow{OcTp'} = (k(u-u0), k(v-v0), 1) \quad \text{formula 18}$$

The coefficient k used here is a constant that can be derived based on the internal parameters of the imaging device 22 and is a parameter that transforms a pixel position (unit is pixel) in the image to a position (unit is m or the like) in the three-dimensional space. From this relation formula, the coordinates (u, v) of a pixel position Tp' in the image photographed by the imaging device 22 regarding the point Tp with coordinate values (xc, yc, a) in the camera coordinate system are obtained from a relation of formula 19.

[Math. 19]

$$u = \frac{xc}{ak} + u0, v = \frac{yc}{ak} + v0, \text{ where } \overrightarrow{OcTp} = (xc, yc, a) \quad \text{Formula 19}$$

Any point on the hydraulic excavator 1 can be transformed from the machine body coordinate system to the camera coordinate system by use of the position-posture information outputted by the position-posture sensing section 401. Moreover, although the bucket locus information outputted by the locus computing section 4022 is represented by coordinate values of the site coordinate system, this can also similarly be transformed from the site coordinate system to the camera coordinate system by use of the position-posture information outputted by the position-posture sensing section 401. From this, at which pixel in the image photographed by the imaging device 22 a point on the front work device 1A or the point included in the bucket locus information appears can be obtained by use of the relation of formula 19.

Figure 10:
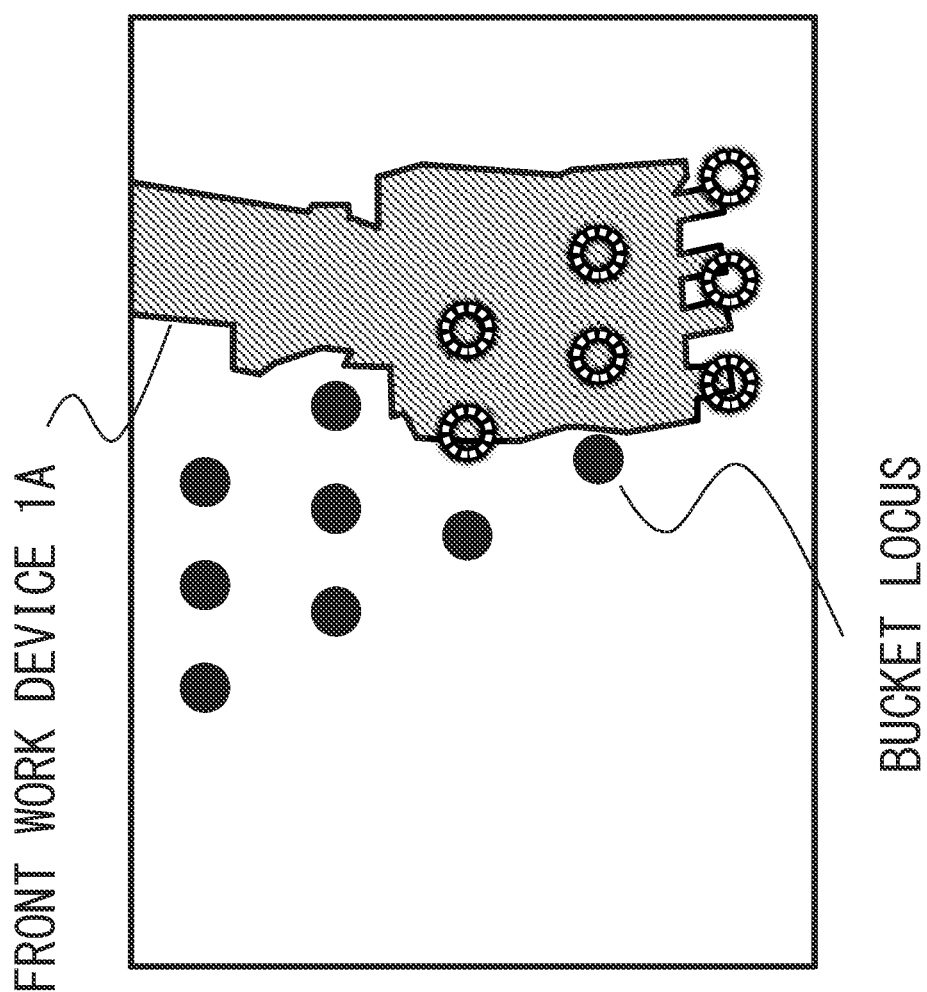
FIG. 10 is a diagram illustrating an example of an image photographed by an imaging device.

An example of the case in which the front work device 1A and the bucket locus appear in an image photographed by the imaging device 22 is illustrated in FIG. 10. The front work device 1A is a part filled with hatching in FIG. 10, and the other points are points of the bucket locus. Here, points indicated by white dotted lines are points of the bucket locus that appear at the same pixels as the pixels at which the front work device 1A appears, and there is possibly a case in which the anteroposterior relation between the points of the bucket locus and the front work device 1A cannot be identified by the image alone. Hence, in the present embodiment, the region in which the front work device 1A appears in the image photographed by the imaging device 22 is masked. When a point that configures the bucket locus appears outside the masked region, the color of the pixel at which the point that configures the bucket locus appears is output as the color information of the point that configures the bucket locus. The mask set here may include parts other than the front work device 1A, such as a structure in surroundings and terrain profile information. Furthermore, as the color information recorded here, a value expressed by use of at least one index in the intensity of a primary color such as red, blue, green, cyan, magenta, yellow, or black, hue, saturation, brightness (or luminance), and so forth may be recorded. A color table may be set in advance, and an ID by which a specific color in the color table can be identified may be recorded as the color information.

When the color information of the point that configures the bucket locus is not obtained in the surface color computing section 4023 for a certain period of time or longer from the start of output of the bucket locus information by the locus computing section 4022 and retention thereof on the RAM, an invalid value set in advance is associated as the color information and is outputted to the working history generating section 4024. Besides the invalid value, a specific color such as black, for example, may be output. Alternatively, the color of a pixel resulting from offsetting from the points that configure the bucket locus appearing in an image under a certain condition may be output. Alternatively, a color decided through complementing based on the color information of the points that configure the bucket locus in surroundings may be output.

The working history generating section 4024 receives, as inputs, the bucket locus information outputted by the locus computing section 4022 and the color information outputted by the surface color computing section 4023, and outputs working history data. In the working history data, the bucket locus information, the color information corresponding to the points that configure the bucket locus information, and working date-and-time information are included. Furthermore, the action determination result outputted by the action determining section 4021 and such information as the distance between the work device and the target surface may be included.

The terrain profile data computing section 403 includes a recording section 4031, a terrain profile coordinate extracting section 4032, a color information adding section 4033, and an output section 4034.

The recording section 4031 records the working history data outputted by the working history computing section 402. The working history data recorded by the recording section 4031 may be the working history data outputted by a specific hydraulic excavator 1 or may be the working history data outputted by multiple hydraulic excavators 1.

The terrain profile coordinate extracting section 4032 extracts position information of points assumed to be close to the current terrain profile in the bucket locus information of the working history data recorded by the recording section 4031 and outputs the position information as terrain profile point group information.

Figure 11:
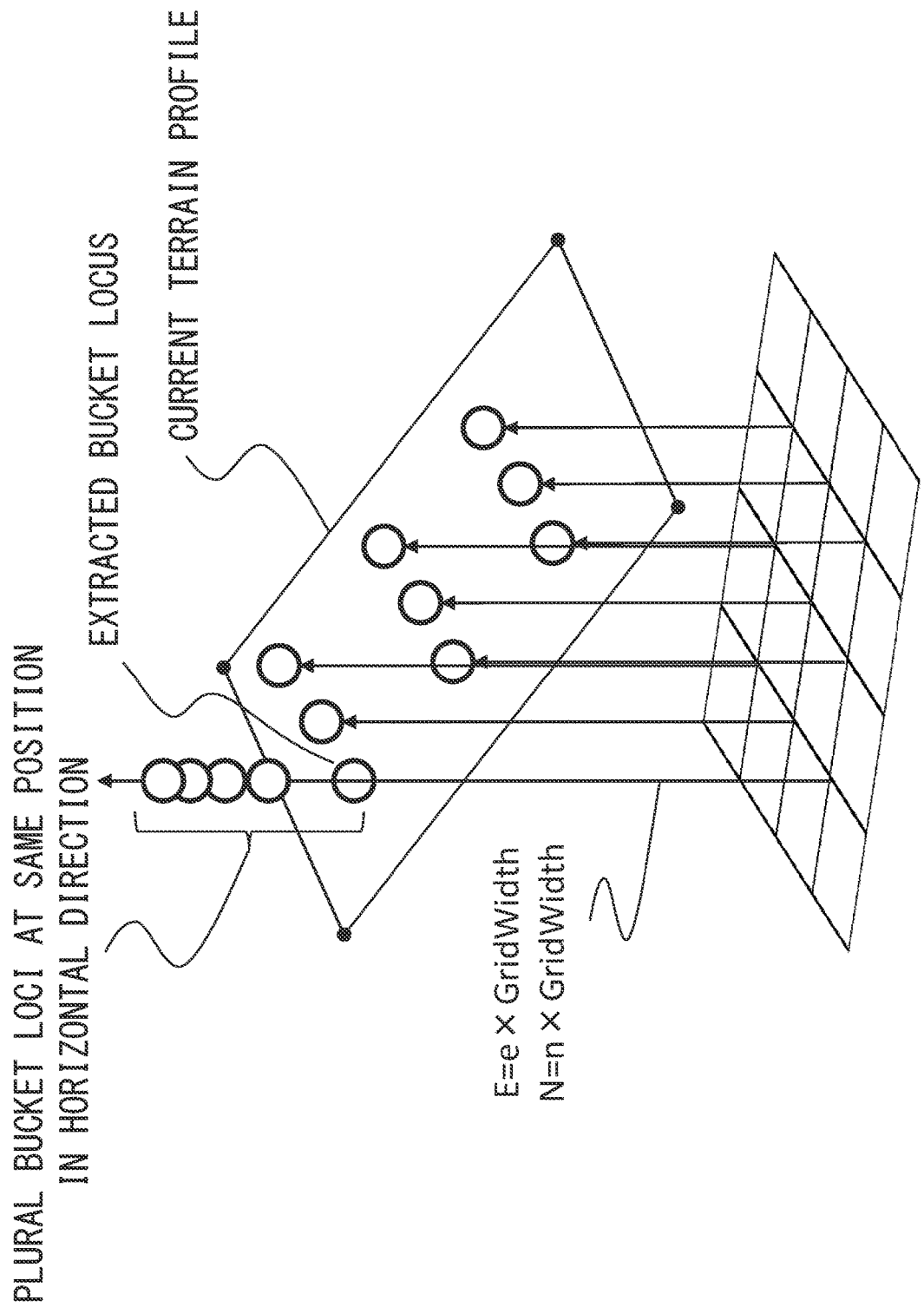
FIG. 11 is a diagram illustrating processing of a terrain profile coordinate extracting section.

FIG. 11 is a diagram illustrating processing of the terrain profile coordinate extracting section 4032. The terrain profile coordinate extracting section 4032 first tallies up the number of points present at the same position in the horizontal direction (position whose coordinate values in the E- and N-axis directions of the site coordinate system are equal) regarding the points that configure the bucket locus information of the working history data recorded by the recording section 4031. Here, regarding the bucket locus information in which only one point is present at the same position in the horizontal direction, the coordinate values of this point are added to the terrain profile point group information. When there are multiple points present at the same position in the horizontal direction, the point assumed to be closest to the current terrain profile among these points is extracted and is added to the terrain profile point group information together with information associated with information other than the bucket locus information included in the working history data, such as a timestamp or a unique ID. Here, regarding the extraction of the point assumed to be close to the current terrain profile, the extraction may be executed by execution of filtering with use of information other than the bucket locus information recorded in the working history data, such as the working date-and-time information, or such information as the height coordinate value of the points that configure the bucket locus information. In the present embodiment, because the current terrain profile changes along the bucket locus, the newest point among the points that configure the bucket locus is added to the terrain profile point group information. Here, in the case of a site in which only earth cutting is executed, the elevation of the current terrain profile always becomes lower and therefore filtering processing in which the coordinates of the point with the lowest elevation among multiple points are added to the terrain profile point group information may be executed. Furthermore, such a method as executing filtering processing other than those cited here, for example, filtering processing with use of the action determination result, may be used.

The color information adding section 4033 receives, as inputs, the terrain profile point group information outputted by the terrain profile coordinate extracting section 4032 and the working history data recorded by the recording section 4031, and outputs color information-added terrain profile point group information.

The color information adding section 4033 extracts the color information corresponding to the bucket locus extracted as the terrain profile point group information, from the working history data recorded by the recording section 4031, and outputs the color information as the color information-added terrain profile point group information in which the extracted bucket locus and color information are combined. Here, when the color information corresponding to the bucket locus extracted as the terrain profile point group information is an invalid value, the color information of a color set in advance (for example, black) is output as the color information-added terrain profile point group information. Besides the color set in advance, the color information corresponding to the bucket locus with another height coordinate value present at the same position in the horizontal direction or the color information complemented with use of the color information of another point present around the point in which the invalid value is included may be employed as the output.

The output section 4034 shapes the color information-added terrain profile point group information outputted by the color information adding section 4033 into a format that allows use in a terrain profile display device 404 and a progress management device 405, and outputs color information-added terrain profile data.

Figure 12:
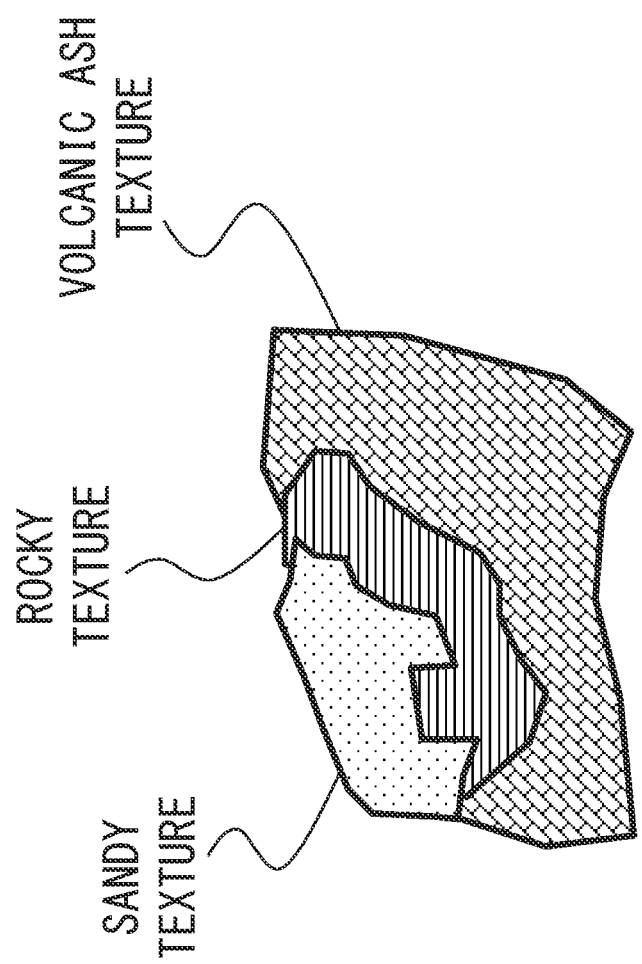
FIG. 12 is a diagram illustrating an example of display of color information-added terrain profile data according to the first embodiment.

The color information-added terrain profile data outputted by the terrain profile data computing section 403 is inputted to the terrain profile display device 404, and the terrain profile display device 404 renders the shape and color of the current terrain profile (see FIG. 12) and presents them to the user. The surface color of the current terrain profile differs depending on, for example, the soil property, the situation of soil (wet, dry, or the like), the density of soil (compacted state or loosened state), and so forth. Hence, association with the work area and the contents of work can easily be executed by rendering and presenting the shape of the current terrain profile together with the color information.

Moreover, the color information-added terrain profile data outputted by the terrain profile data computing section 403 is inputted to the progress management device 405, and the progress management device 405 computes progress management information of earned value, completed work, and so forth and presents it to the user. In general, when the progress management information is computed, earned value and completed work regarding each region of a specific work area or specific contents of work are a subject of interest in many cases. The progress management device 405 in the present embodiment can compute earned value and completed work regarding each region of a specific work area or specific contents of work by executing filtering and trimming of terrain profile data with use of the color information of the color information-added terrain profile data. For example, because the surface color of the ground differs in a region in which the soil property is different, the progress of work according to the soil property can be managed by dividing the terrain profile data for each of regions different in the surface color, on the basis of the color information, and computing earned value regarding each of the respective regions.

Part of the information presentation and the information processing by the terrain profile display device 404 and the progress management device 405 may be executed by the display device 23 installed on the hydraulic excavator 1 or such a device as a smartphone, a tablet, or a personal computer present outside the hydraulic excavator 1.

Computation processing of the working history computing section 402 will be described with use of FIG. 13 and FIG. 14. Processing of FIG. 13 and processing of FIG. 14 are concurrently executed.

Figure 13:
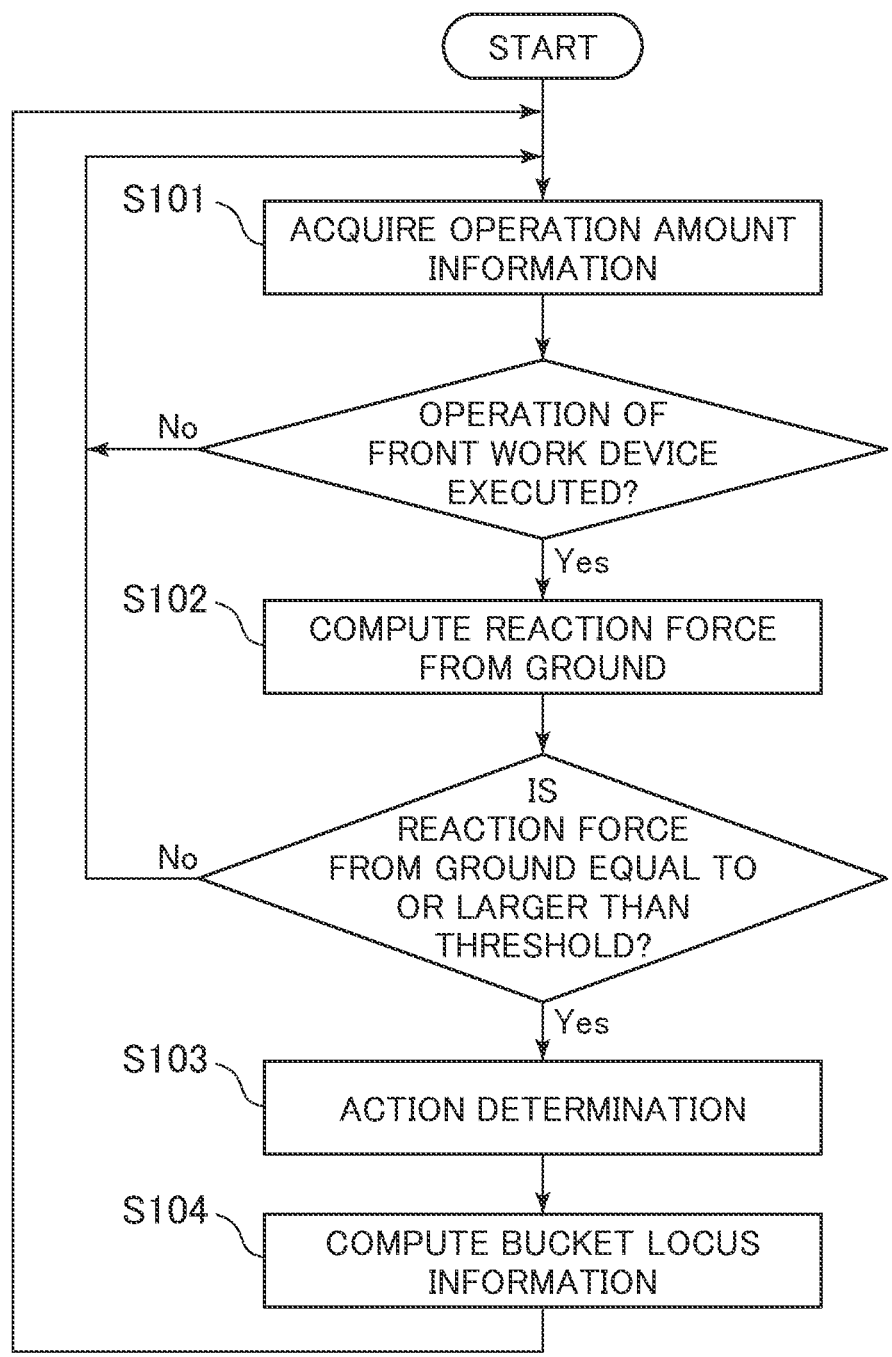
FIG. 13 is a flowchart illustrating computation processing of a working history computing section in the first embodiment of the present invention.
Figure 14:
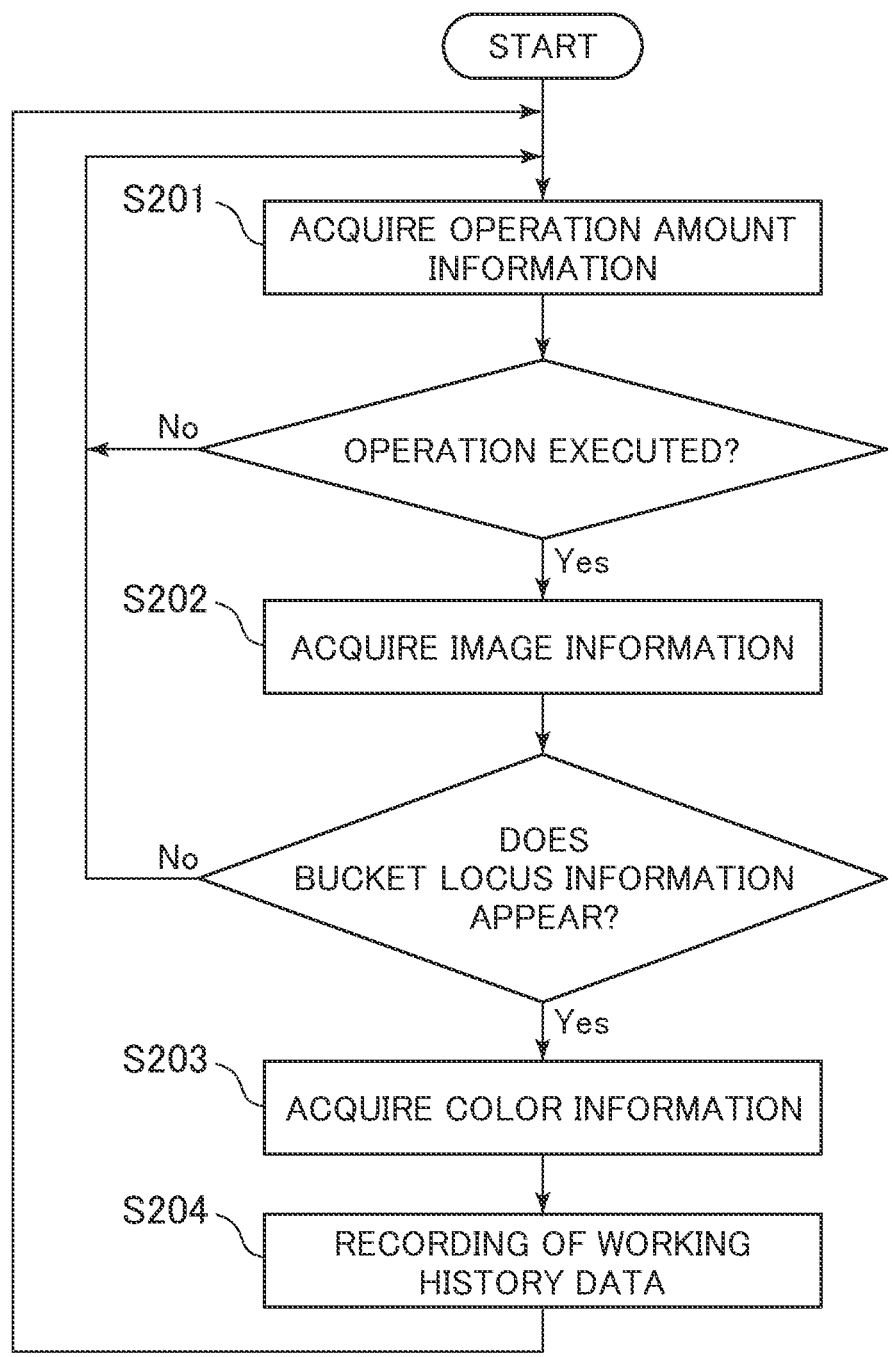
FIG. 14 is a flowchart illustrating computation processing of the working history computing section in the first embodiment of the present invention.

In FIG. 13, first, the action determining section 4021 of the working history computing section 402 acquires the operation amount information from the operation amount sensor 20 (step S101). When operation of any one or more in the respective parts of the front work device 1A is being executed, proceeding to step S102 is made. When operation input of none of the respective parts of the front work device 1A is made, a return to step S101 is made.

In step S102, the action determining section 4021 of the working history computing section 402 computes the reaction force from the ground by using the position-posture information and the pressure information of the boom cylinder 5. When the reaction force from the ground is equal to or larger than a threshold, proceeding to step S103 is made. When it is smaller than the threshold, a return to step S101 is made.

In step S103, the action determining section 4021 of the working history computing section 402 executes action determination by using the position-posture information, the working target surface information, and the operation amount information and proceeds to step S104.

In step S104, the locus computing section 4022 computes the bucket locus information by using the action determination result outputted by the action determining section 4021 and the X- and Z-coordinate values of the bucket monitoring point in the machine body coordinate system, records the bucket locus information on the RAM, and then returns to step S101.

In FIG. 14, first, the surface color computing section 4023 of the working history computing section 402 acquires the operation amount information from the operation amount sensor 20 (step S201). When any one or more operations in operations of the respective parts of the front work device 1A and operations of travelling, swing, and so forth are being executed, proceeding to step S202 is made. When operation input of none is made, a return to step S201 is made.

In step S202, the surface color computing section 4023 of the working history computing section 402 acquires image information regarding the image photographed by the imaging device 22. Here, by use of the position-posture information outputted by the position-posture sensing section 401, a region in which an obstacle such as the front work device 1A appears and pixels at which points included in the bucket locus information appear in the acquired image information are computed. At this time, when the point included in the bucket locus information appears in a region in which an obstacle such as the front work device 1A does not appear, proceeding to step S203 is made. When the point does not appear, a return to step S201 is made.

In step S203, the surface color computing section 4023 of the working history computing section 402 associates the color information of the pixel at which the point included in the bucket locus information appears with the coordinates of the point included in the bucket locus information and outputs them to the working history generating section 4024 and proceeds to step S204.

In step S204, the working history generating section 4024 of the working history computing section 402 generates the working history data including the bucket locus information outputted by the locus computing section 4022, the color information outputted by the surface color computing section 4023, the working date-and-time information, and so forth. The working date-and-time information can be acquired from an internal clock of the computation device 101.

Figure 15:
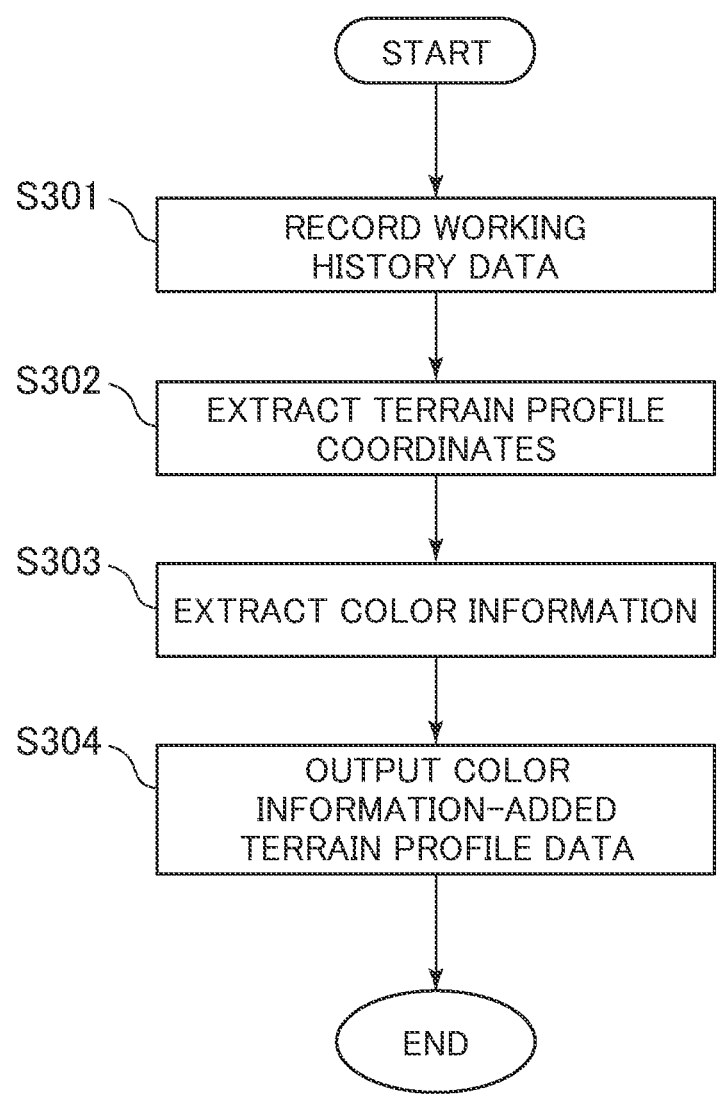
FIG. 15 is a flowchart illustrating computation processing of a terrain profile data computing section in the first embodiment of the present invention.

Next, computation processing of the terrain profile data computing section 403 will be described with use of FIG. 15.

First, the recording section 4031 of the terrain profile data computing section 403 records the working history data generated by the working history generating section 4024 of the working history computing section 402 (step S301). Next, the terrain profile coordinate extracting section 4032 extracts the position information of points assumed to be close to the current terrain profile among the pieces of the bucket locus information of the working history data recorded by the recording section 4031 and outputs the position information as the terrain profile point group information (step S302). The color information adding section 4033 extracts the color information corresponding to the bucket locus extracted as the terrain profile point group information, from the working history data recorded by the recording section 4031, and outputs the color information as the color information-added terrain profile point group information in which the extracted bucket locus and color information are combined (step S303). The output section 4034 shapes the color information-added terrain profile point group information outputted by the color information adding section 4033 into a format that allows use in the terrain profile display device 404 and the progress management device 405 and outputs the color information-added terrain profile data (step S304).

Based on the above configuration, the bucket locus information and the color information of the ground in work execution are recorded in the working history data, and the current terrain profile data to which the color information is added is outputted by execution of various kinds of processing for the working history data. The output color information-added terrain profile data can express, by the color information, for example, the soil property, the situation of soil (wet, dry, or the like), the density of soil (compacted state or loosened state), and so forth when being displayed by the terrain profile display device 404, and association with the work area and the contents of work can easily be executed. Furthermore, in the progress management device 405, it is possible to compute earned value and completed work regarding each region of a specific work area or specific contents of work, on the basis of the color information.

(Overview)

In the present embodiment, in the completed-work information processing system including the computation device 101 that generates terrain profile data that represents the current terrain profile obtained after work execution by the work device 1A of the work machine 1, the completed-work information processing system includes the operation amount sensor 20 that senses the operation amount of the work machine 1, the position-posture sensors 12, 13, 14, 16a, 16b, and 17 that sense the position of the work machine 1 and the posture of the work device 1A, the driving state sensor 19 that senses the driving state of the work device 1A, and the working information acquiring device 22 that acquires the working information that is information relating to work execution when the work device 1A is executing work of the ground. The computation device 101 determines whether or not the work device 1A is executing work of the ground, on the basis of sensed values from the operation amount sensor 20, the position-posture sensors 12, 13, 14, 16a, 16b, and 17, and the driving state sensor 19, and computes movement loci of the work device 1A when the work device 1A is executing the work of the ground and acquires the working information from the working information acquiring device 22 when determining that the work device 1A is executing the work of the ground. Moreover, the computation device 101 records data in which the working information is associated with the movement loci of the work device 1A, as the working history data, and outputs the terrain profile data to which the working information is added, with use of the movement locus assumed to be the current terrain profile among the movement loci of the work device 1A included in the working history data and the working information associated with the movement locus assumed to be the current terrain profile.

According to the present embodiment configured as above, it becomes possible to recognize the working information of each part of the current terrain profile, making it easier to associate the current terrain profile with the work area and the contents of work.

Moreover, the completed-work information processing system according to the present embodiment includes the display device 404 capable of displaying information outputted from the computation device 101, and the display device 404 changes the display form of the terrain profile data according to the working information added to the terrain profile data. This makes it possible to visually recognize the working information of each part of the current terrain profile.

Further, the working information in the present embodiment is the color information. This makes it possible to recognize the working information of each part of the current terrain profile by color.

Further, the working information acquiring device 22 in the present embodiment is configured by the imaging device 22 attached to the work machine 1, and the computation device 101 acquires, as the working information, the color information of an execution surface photographed by the imaging device 22 when the work device 1A is executing the work of the ground. This makes it possible to recognize the soil property and the situation of soil (wet, dry, or the like) regarding each part of the current terrain profile.

Second Embodiment

A completed-work information processing system according to a second embodiment of the present invention will be described with a focus on differences from the first embodiment.

The configuration of the completed-work information processing system according to the present embodiment is similar to that of the first embodiment (see FIG. 1).

Figure 16:
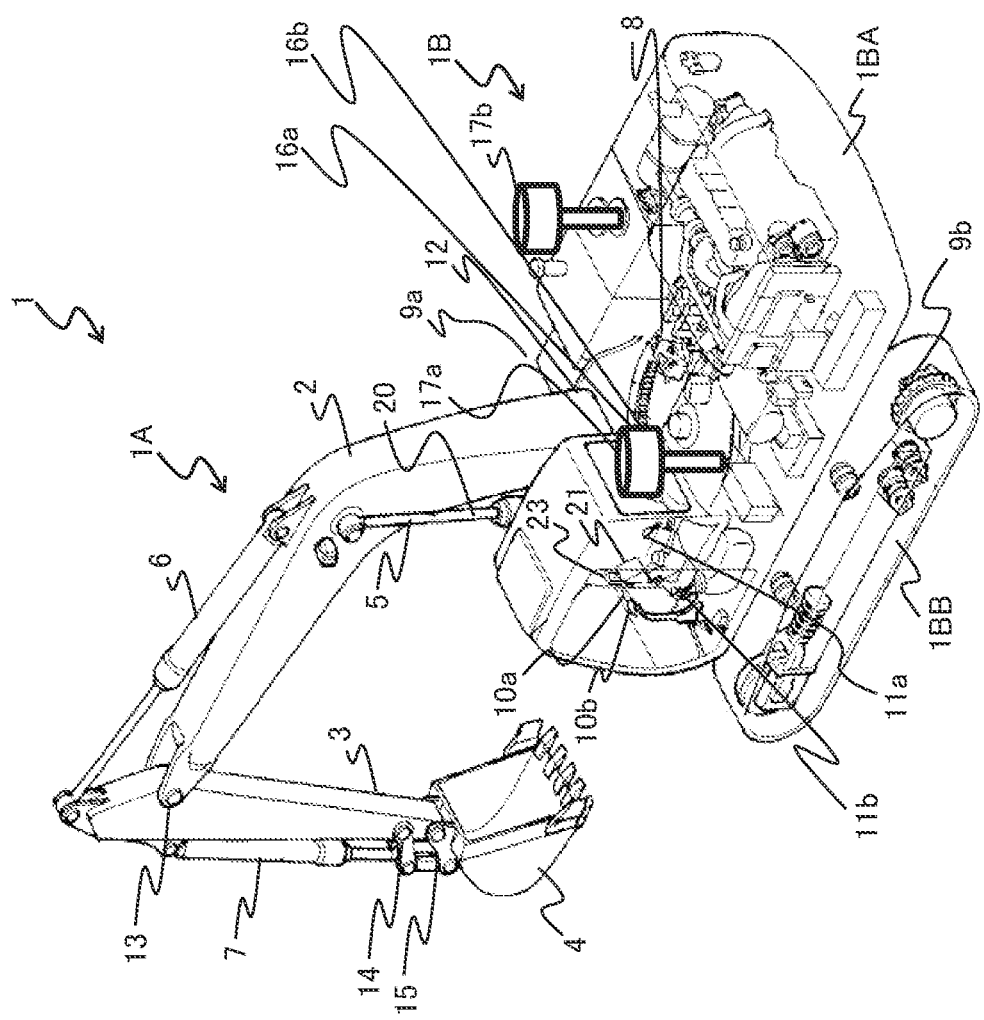
FIG. 16 is a configuration diagram of the hydraulic excavator in a second embodiment of the present invention.

FIG. 16 is a configuration diagram of the hydraulic excavator 1 in the present embodiment. In FIG. 16, the difference from the first embodiment (see FIG. 2) is that the hydraulic excavator 1 does not include the imaging device 22 (see FIG. 2).

Figure 17:
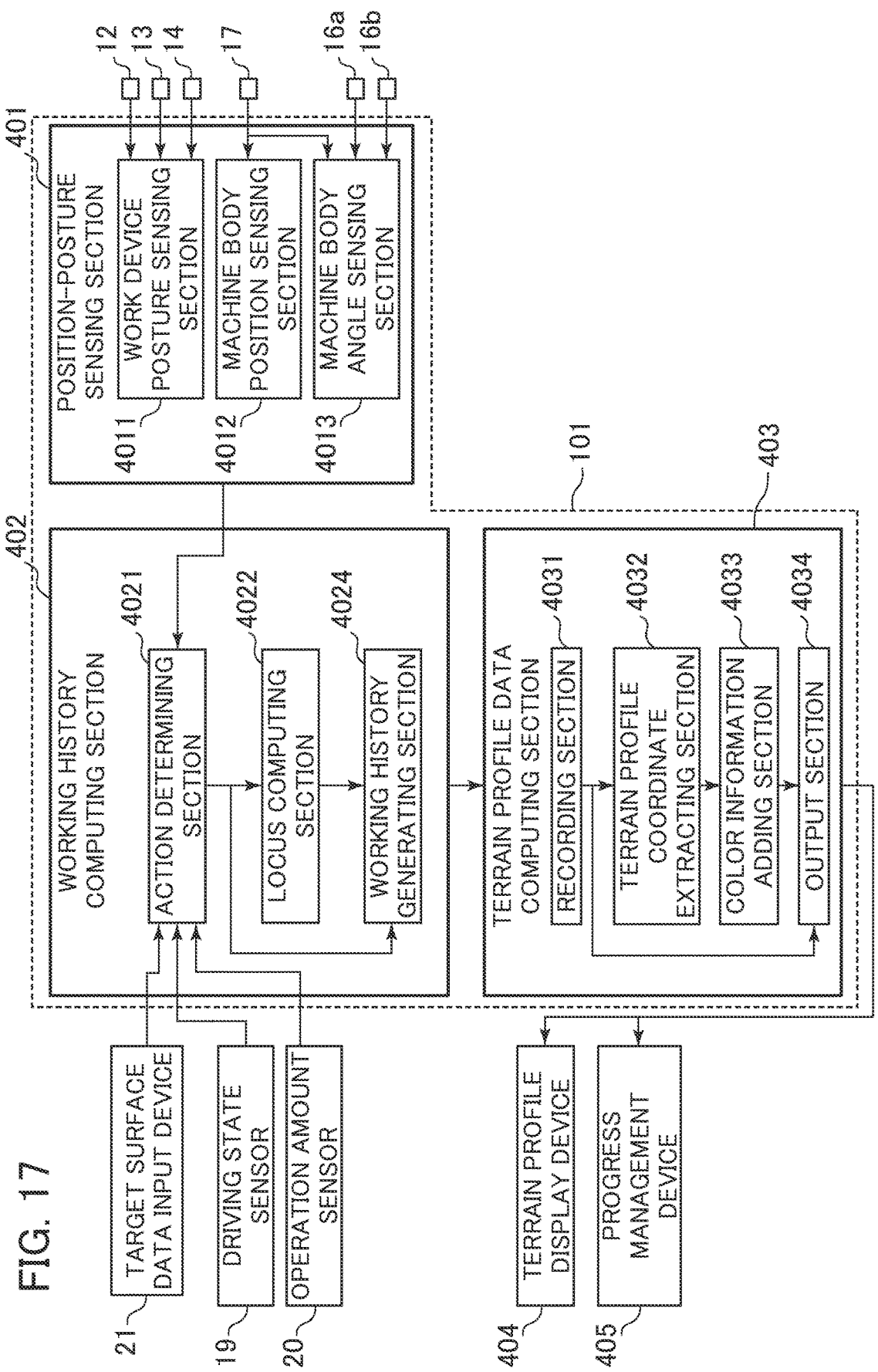
FIG. 17 is a functional block diagram of the computation device in the second embodiment of the present invention.

FIG. 17 is a functional block diagram of the computation device 101 in the present embodiment. In FIG. 17, the difference from the first embodiment (see FIG. 4) is that the computation device 101 does not include the surface color computing section 4023 (see FIG. 4).

Suppose that the action determining section 4021 in the present embodiment executes processing as in the first embodiment and outputs also working target surface information of the vicinity of the bucket monitoring point. However, the working target surface information mentioned here is a normal vector to a target surface. The working target surface information may be information other than the normal vector, and may be, for example, information with which a surface that configures the target surface can be identified (ID assigned to all surfaces that configure the target surface in advance, or the like) or such information as the angle (inclination angle) formed by the horizontal plane and the normal vector.

The working history generating section 4024 in the present embodiment receives, as inputs, the action determination result and the working target surface information outputted by the action determining section 4021 and the bucket locus information outputted by the locus computing section 4022, and outputs the working history data obtained by the working date-and-time information being added to these pieces of input information.

The terrain profile data computing section 403 includes the recording section 4031, the terrain profile coordinate extracting section 4032, the color information adding section 4033, and the output section 4034.

The color information adding section 4033 extracts the action determination result (contents-of-work information) corresponding to the bucket locus extracted as the terrain profile point group information, the working date-and-time information, and the working target surface information from the working history data recorded by the recording section 4031. In accordance with a condition set in advance, the color information adding section 4033 decides the color information by using these extracted pieces of information and outputs the color information as the color information-added terrain profile point group information in which the bucket locus and the color information are combined.

Specific examples will be illustrated below.

First, in the case of deciding the color information by using the action determination result as the working information, because there are only a finite number of kinds as the action determination class, it is possible to decide the color information according to the action determination result by setting the combinations of the action determination class and the color in advance, in such a manner as red when the action determination result is "excavation action," blue when it is "compaction action," and green when it is "bumping action." Also when the action determination classes are other than the three classes illustrated here, combinations of the color according to the number of classes are only required to be prepared similarly. The working information acquiring device in this case is configured by the operation amount sensor 20 and the driving state sensor 19.

Next, in the case of deciding the color information by using the working date-and-time information as the working information, the working date-and-time information can take a value in any range according to the period of the work execution. Hence, the color information needs to be decided according to the period corresponding to a use purpose such as progress management. That is, in the case in which the working date-and-time information corresponding to the bucket locus extracted as the terrain profile point group information spans a range of n days and checking the progress in every m days with use of the terrain profile data outputted by the terrain profile data computing section 403 is desired, it suffices if a color palette with approximately (n/m) colors is prepared in advance and the color information is decided from the color palette according to the working date-and-time information. For example, it suffices if a color palette with three colors is set in advance when the terrain profile data is desired to be used for progress check in every seven days (one week) at a site in which the working period is 21 days. That is, it suffices if the color information is decided as red for first to seventh day, blue for eighth to fourteenth day, and green for fifteenth to twenty-first day. For the color palette mentioned here, any desired colors may manually be set in advance or setting may automatically be made based on a gradation in which the brightness, the saturation, the hue, and so forth sequentially change. The working information acquiring device in this case is configured by an internal clock of the computation device 101.

At last, in the case of deciding the color information by using the working target surface information (normal vector to the working target surface) as the working information, because the normal vector is information having three components, it suffices if the color information is decided through converting the respective components (−1.0 to 1.0) when the normal vector is made into a unit vector (vector whose direction is the same as the normal vector and whose norm is 1) to RGB components (0 to 255). For example, when the normal vector is (0.5, 0.5, 0.7071), the color information can be decided as (R, G, B)=(191, 191, 218). The working information acquiring device in this case is configured by the target surface data input device 21 that inputs the working target surface information to the computation device 101.

Further, in the case of deciding the color information by using the working target surface information (normal vector to the working target surface) as the working information, the color information may be decided based on an index that can be computed by use of the normal vector. That is, the inclination angle of the target surface (angle formed by the horizontal plane and the target surface) may be obtained by use of the inner product of the normal vector and a gravity direction vector, and the color according to the inclination angle may be decided as the color information. Here, the inclination angle takes a successive value between −90 and 90 degrees. When color differentiation by the inclination angles of every n degrees is desired, a color palette with (180/n) colors may be prepared in advance, and the color according to the inclination angle may be decided as the color information, or the user may set a color according to an inclination angle in any range.

The output section 4034 shapes the color information-added terrain profile point group information outputted by the color information adding section 4033 into a format that allows use in the terrain profile display device 404 and the progress management device 405, and outputs the color information-added terrain profile data.

Figure 18:
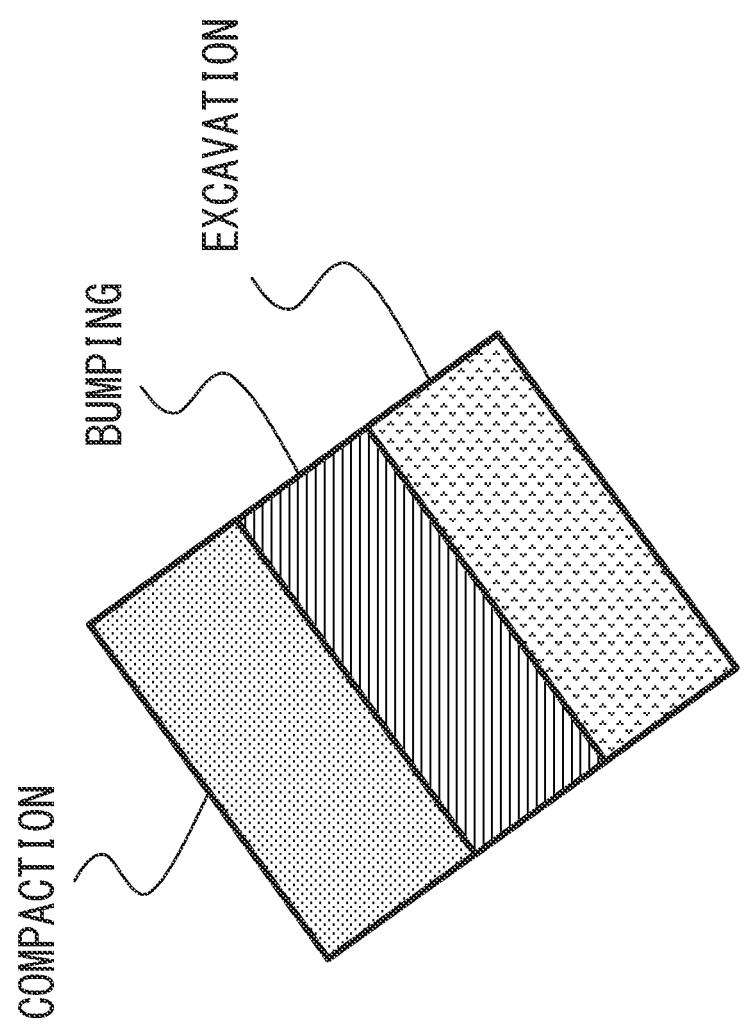
FIG. 18 is a diagram illustrating a display example of terrain profile data to which color information based on contents-of-work information is added.
Figure 19:
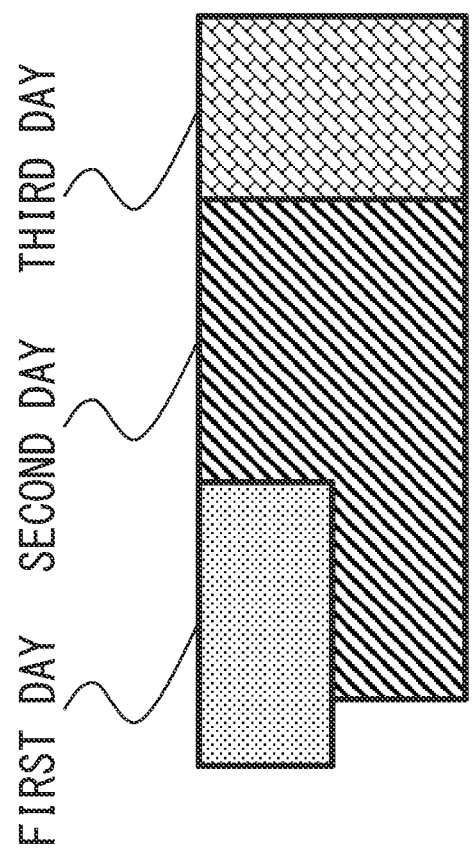
FIG. 19 is a diagram illustrating a display example of the terrain profile data to which the color information based on working date-and-time information is added.
Figure 20:
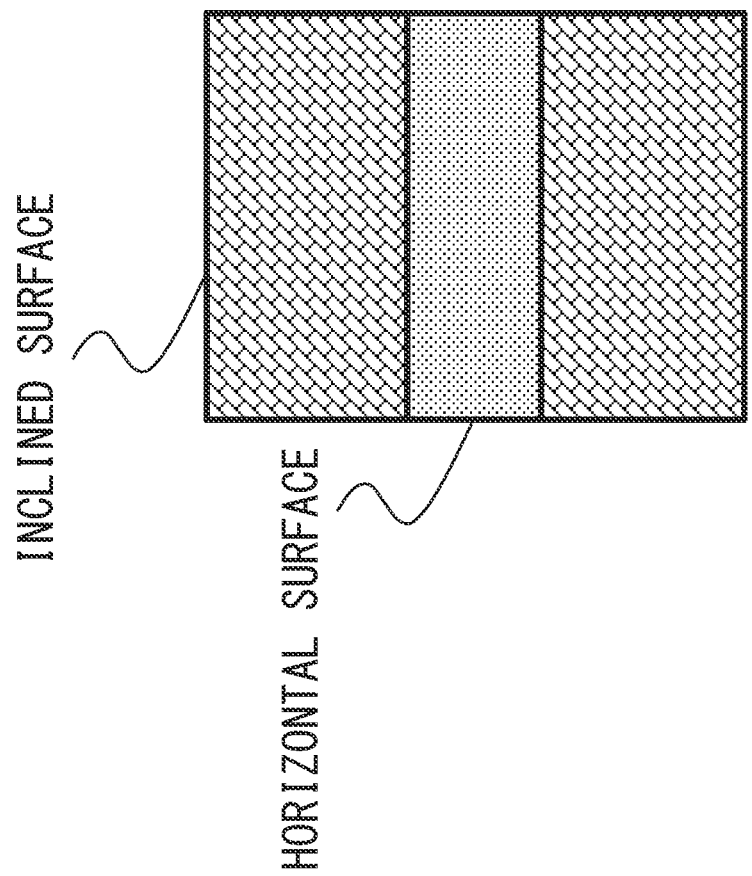
FIG. 20 is a diagram illustrating a display example of the terrain profile data to which the color information based on working target surface information is added.

The color information-added terrain profile data outputted by the terrain profile data computing section 403 is inputted to the terrain profile display device 404, and the terrain profile display device 404 renders the shape and color of the terrain profile and presents them to the user. Here, when the color information is added based on the action determination result (contents-of-work information) in the color information adding section 4033, association between the contents of work and the terrain profile data is understood at a glance as illustrated in FIG. 18. Moreover, when the color information is added based on the working date-and-time information, the terrain profile data, the contents of work, and the work area can be associated as illustrated in FIG. 19 as long as the contents of work and the work area of each work day are recognized. Further, when the color information is added based on the working target surface information (normal vector), for example, the inclination angle of the target surface (working target surface information), a horizontal surface and inclined surfaces can be distinguished as illustrated in FIG. 20. That is, work of finishing slopes and a top end surface being executed is recognized, and it is hence possible to associate the terrain profile data and the contents of work.

The progress management device 405 in the present embodiment can associate the terrain profile data, the contents of work, and the work area by the color information decided based on the action determination result (contents-of-work information), the working date-and-time information, or the working target surface information, as illustrated with the terrain profile display device 404. Thus, the progress management device 405 can compute earned value and completed work regarding each region of a specific work area or specific contents of work by executing filtering and trimming of the terrain profile data with use of these pieces of color information.

Figure 21:
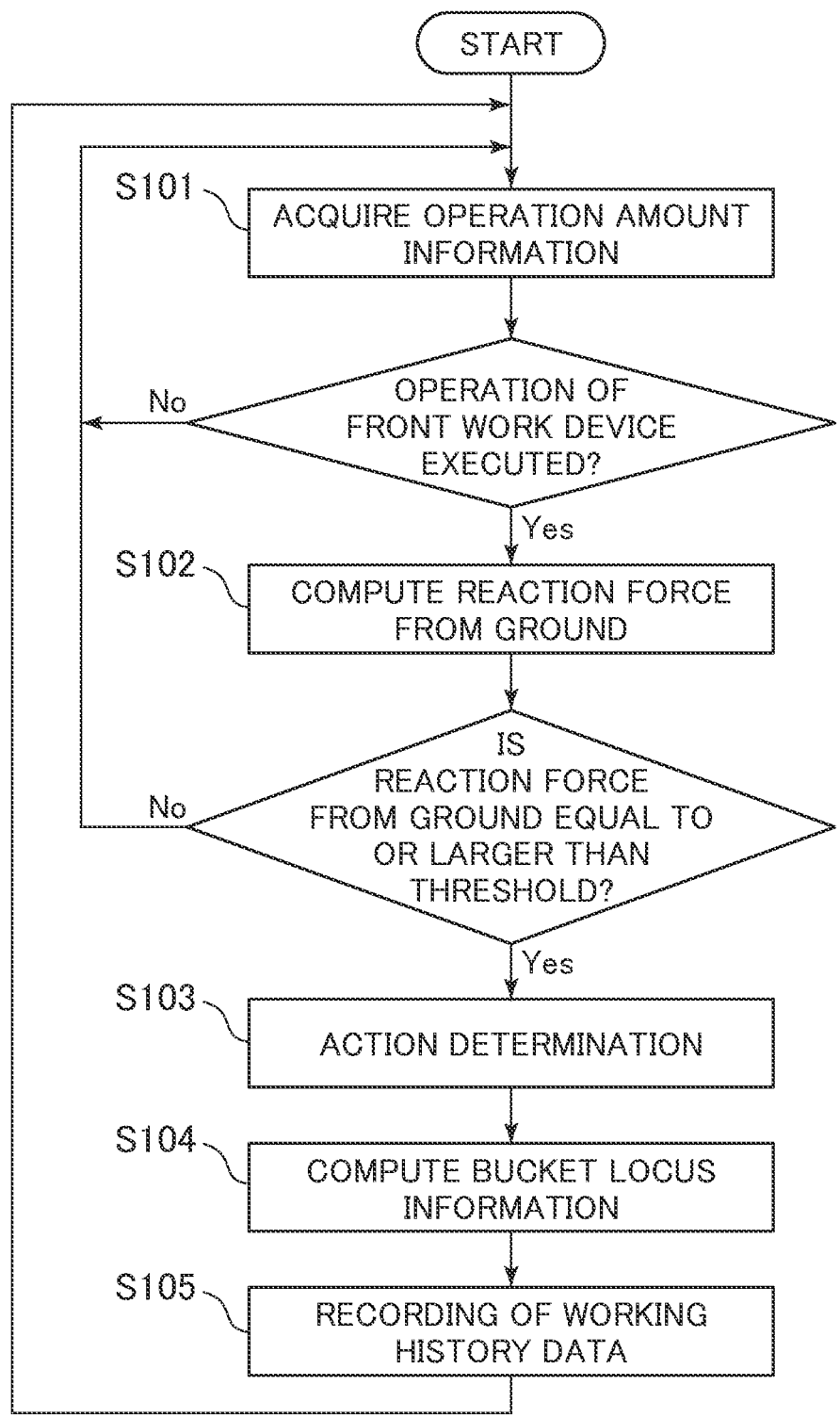
FIG. 21 is a flowchart illustrating computation processing of the working history computing section in the second embodiment of the present invention.

Computation processing of the working history computing section 402 will be described with use of FIG. 21. In FIG. 21, the difference from the first embodiment (see FIG. 13) is that step S105 is executed subsequently to step S104.

In step S105, the working history generating section 4024 of the working history computing section 402 generates the working history data including the action determination result (contents-of-work information) and the working target surface information outputted by the action determining section 4021, the bucket locus information outputted by the locus computing section 4022, the working date-and-time information, and so forth, and returns to step S101.

Next, computation processing of the terrain profile data computing section 403 will be described with use of FIG. 22. In FIG. 22, the difference from the first embodiment (see FIG. 15) lies in the processing of the step S303.

In the S303, the color information adding section 4033 generates the color information corresponding to the bucket locus extracted as the terrain profile point group information, on the basis of the action determination result (contents-of-work information), the working date-and-time information, or the working target surface information, and outputs the color information as the color information-added terrain profile point group information (color information-added terrain profile data) in which the bucket locus and the color information are combined.

(Overview)

The computation device 101 in the present embodiment acquires the contents-of-work information when the work device 1A is executing work of the ground, as the working information that is information relating to work execution when the work device 1A is executing the work of the ground, on the basis of sensed values from the operation amount sensor 20 and the driving state sensor 19.

Alternatively, the working information acquiring device in the present embodiment is configured by the internal clock of the computation device 101, and the computation device 101 acquires the working date-and-time information when the work device 1A is executing the work of the ground, as the working information.

Alternatively, the working information acquiring device in the present embodiment is configured by the target surface data input device 21 that inputs the working target surface information to the computation device 101, and the computation device 101 acquires the working target surface information when the work device 1A is executing the work of the ground, as the working information.

Based on the above configuration, in the present embodiment, the current terrain profile data to which the color information is added is output with use of the bucket locus information recorded in the working history data and the color information generated based on the action determination result (contents-of-work information), the working date-and-time information, or the working target surface information. The output color information-added terrain profile data allows easy association with the work area and the contents of work by the color information corresponding to the action determination result, the working date-and-time information, or the working target surface information, when being displayed by the terrain profile display device 404. Furthermore, in the progress management device 405, it is possible to compute earned value and completed work regarding each region of a specific work area or specific contents of work by using the color information corresponding to the action determination result, the working date-and-time information, or the working target surface information.

Although the embodiments of the present invention have been described in detail above, the present invention is not limited to the above-described embodiments, and various modification examples are included therein. For example, the above-described embodiments are those that are described in detail in order to explain the present invention in an easy-to-understand manner and are not necessarily limited to one that includes all configurations described. Furthermore, it is also possible to add part of the configuration of a certain embodiment to the configuration of another embodiment, and it is also possible to delete part of the configuration of a certain embodiment or replace the part by part of another embodiment.

DESCRIPTION OF REFERENCE CHARACTERS

1: Hydraulic excavator (work machine)
1A: Front work device
1B: Machine body
1BA: Upper swing structure
1BB: Lower track structure
2: Boom
3: Arm
4: Bucket
5: Boom cylinder
6: Arm cylinder
7: Bucket cylinder
8: Swing hydraulic motor
9a: Travelling motor
9b: Travelling motor
10a: Travelling right lever
10b: Travelling left lever
11a: Operation right lever
11b: Operation left lever
12: Boom angle sensor (position-posture sensor)
13: Arm angle sensor (position-posture sensor)
14: Bucket angle sensor (position-posture sensor)
15: Bucket link
16a: Machine body front-rear inclination angle sensor (position-posture sensor)
16b: Machine body left-right inclination angle sensor (position-posture sensor)
17: GNSS receiver (position-posture sensor)
17a: First GNSS antenna
17b: Second GNSS antenna
18: Proportional control valve
19: Driving state sensor (working information acquiring device)
20: Operation amount sensor (working information acquiring device)
21: Target surface data input device (working information acquiring device)
22: Imaging device (working information acquiring device)
23: Display device
101: Computation device
401: Position-posture sensing section
402: Working history computing section
403: Terrain profile data computing section
404: Terrain profile display device
405: Progress management device
4011: Work device posture sensing section
4012: Machine body position sensing section
4013: Machine body angle sensing section
4021: Action determining section
4022: Locus computing section
4023: Surface color computing section
4024: Working history generating section
4031: Recording section
4032: Terrain profile coordinate extracting section
4033: Color information adding section
4034: Output section

The invention claimed is:

1. A completed-work information processing system including a computation device that generates terrain profile data that represents a current terrain profile obtained after work execution by a work device of a work machine, the completed-work information processing system comprising:
an operation amount sensor that senses an operation amount of the work machine;
position-posture sensors that sense a position of the work machine and a posture of the work device;
a driving state sensor that senses a driving state of the work device; and
a display device capable of displaying information outputted from the computation device,
wherein the computation device is configured to:
determine whether or not the work device is executing work of the ground, on a basis of sensed values from the operation amount sensor, the position-posture sensors, and the driving state sensor,
compute coordinate information of multiple points on a plane that configures the movement loci of the work device when the work device is executing the work of the ground and acquire working date-and-time information when the work device is executing the work of the ground from an internal clock of the computation device in a case of determining that the work device is executing the work of the ground,
record data in which the working date-and-time information are associated with the coordinate information of the multiple points on the plane that configures the movement loci of the work device, as working history data,
extract from the working history data coordinate information of the multiple points assumed to be the current terrain profile and the working date-and-time information associated with the coordinate information of the multiple points assumed to be the current terrain profile based on the working date-and-time information or information regarding the height of the coordinate information of the multiple points on the plane that configures the movement locus of the work device among the working history data,
decide color information corresponding to the working date-and-time information extracted from the working history data according to a color palette in which a range of the working date-and-time information and different color information for each range are set, and
generate the terrain profile data to which the color information is added, with use of the coordinate information of the multiple points assumed to be the current terrain profile among the coordinate information of the multiple points on the plane that configures the movement loci of the work device included in the working history data and the color information of the working date-and-time information associated with the coordinate information of the multiple points assumed to be the current terrain profile, and
output the terrain profile data to which the color information is added to the display device, and wherein the display device is configured to render the shape and color of the terrain profile based on the terrain profile data to which the color information is added and present them to the user.

* * * * *